United States Patent
Nishio et al.

(10) Patent No.: US 12,294,995 B2
(45) Date of Patent: May 6, 2025

(54) RECEPTION DEVICE, TRANSMISSION DEVICE, RECEPTION METHOD, AND TRANSMISSION METHOD

(71) Applicant: Panasonic Intellectual Property Corporation of America, Torrance, CA (US)

(72) Inventors: Akihiko Nishio, Osaka (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 337 days.

(21) Appl. No.: 17/798,280

(22) PCT Filed: Dec. 10, 2020

(86) PCT No.: PCT/JP2020/046168
§ 371 (c)(1),
(2) Date: Aug. 8, 2022

(87) PCT Pub. No.: WO2021/161639
PCT Pub. Date: Aug. 19, 2021

(65) Prior Publication Data
US 2023/0101732 A1 Mar. 30, 2023

(30) Foreign Application Priority Data
Feb. 13, 2020 (JP) .................. 2020-022830

(51) Int. Cl.
*H04W 72/1273* (2023.01)
*H04W 72/20* (2023.01)
(Continued)

(52) U.S. Cl.
CPC ....... *H04W 72/1273* (2013.01); *H04W 72/20* (2023.01); *H04W 80/02* (2013.01); *H04W 84/06* (2013.01)

(58) Field of Classification Search
CPC . H04W 72/1273; H04W 72/20; H04W 80/02; H04W 84/06; H04W 72/23; H04B 7/18513
See application file for complete search history.

(56) References Cited

U.S. PATENT DOCUMENTS

2019/0191399 A1\* 6/2019 Islam .................. H04W 72/046
2020/0100295 A1\* 3/2020 Pao ...................... H04L 5/0082
(Continued)

OTHER PUBLICATIONS

3GPP TS 23.501 V16.1.0, "3rd Generation Partnership Project; Technical Specification Group Services and System Aspects; System Architecture for the 5G System; Stage 2 (Release 16)," Jun. 2019, 368 pages.
(Continued)

*Primary Examiner* — Christine Ng
(74) *Attorney, Agent, or Firm* — Seed IP Law Group LLP

(57) ABSTRACT

An appropriate MAC Control Element (CE) operation start timing control process is realized in an NTN system. A terminal 100 comprises: a wireless reception unit 106 that receives a MAC CE and an offset value ($K_{MAC\_ACTION}$, etc.); and a control unit 110 that, on the basis of the offset value, sets a slot for starting an operation based on a MAC CE control command.

14 Claims, 15 Drawing Sheets

(51) Int. Cl.
*H04W 80/02* (2009.01)
*H04W 84/06* (2009.01)

(56) References Cited

U.S. PATENT DOCUMENTS

| | | | | |
|---|---|---|---|---|
| 2020/0314819 | A1* | 10/2020 | Loehr | H04W 4/40 |
| 2021/0184812 | A1* | 6/2021 | MolavianJazi | H04L 1/0041 |
| 2021/0314866 | A1* | 10/2021 | Lee | H04W 76/28 |
| 2021/0377937 | A1* | 12/2021 | Takeda | H04W 72/20 |
| 2022/0104265 | A1* | 3/2022 | Bang | H04W 74/006 |
| 2022/0312283 | A1* | 9/2022 | Chen | H04W 36/0016 |
| 2022/0408384 | A1* | 12/2022 | Määttanen et al. | H04W 56/005 |
| 2023/0101732 | A1* | 3/2023 | Nishio | H04W 72/20 370/329 |

OTHER PUBLICATIONS

3GPP TS 38.211 V15.6.0, "3rd Generation Partnership Project; Technical Specification Group Radio Access Network; NR; Physical channels and modulation (Release 15)," Jun. 2019, 97 pages.

3GPP TS 38.213 V15.8.0, "3rd Generation Partnership Project; Technical Specification Group Radio Access Network; NR; Physical layer procedures for control (Release 15)," Dec. 2019, 109 pages.

3GPP TS 38.300 V15.6.0, "3rd Generation Partnership Project; Technical Specification Group Radio Access Network; NR; NR and NG-RAN Overall Description; Stage 2 (Release 15)," Jun. 2019, 99 pages.

3GPP TS 38.321 V15.8.0, "3rd Generation Partnership Project; Technical Specification Group Radio Access Network; NR; Medium Access Control (MAC) protocol specification (Release 15)," Dec. 2019, 78 pages.

3GPP TR 38.821 V16.0.0, "3rd Generation Partnership Project; Technical Specification Group Radio Access Network; Solutions for NR to support non-terrestrial networks (NTN) (Release 16)," Dec. 2019, 140 pages.

Ericsson, "TP for Section 6.2 in TR 38.821 on NTN PHY control procedures," R1-1913402, Agenda Item: 7.2.5, 3GPP TSG-RAN WG1 Meeting #99, Reno, USA, Nov. 18-22, 2019, 7 pages.

International Search Report, mailed Mar. 9, 2021, for International Application No. PCT/JP2020/046168, 3 pages. (with English translation).

Samsung, "CR on Timing for MAC CE Applicability," R1-1907963, 3GPP TSG RAN WG1 Meeting #97, Reno, USA, May 13-17, 2019, 5 pages.

Ericsson, "Feature lead summary on timing relationship enhancements," R1-200xxxx, Agenda Item: 8.4.1, 3GPP TSG-RAN WG1 Meeting #102-e, e-Meeting, Aug. 17-28, 2020, 64 pages.

Extended European Search Report dated Jun. 15, 2023, for the corresponding European Patent Application No. 20919059.4, 7 pages.

Sony, "Discussion on delay-tolerant HARQ for NTN," R1-1912349, Agenda Item: 7.2.5.4, 3GPP TSG RAN WGI Meeting #99, Reno, USA, Nov. 18-22, 2019, 6 pages.

Huawei et al., "Discussion on 2-step RACH procedure," R1-1911872, Agenda Item: 7.2.1.2, 3GPP TSG RAN WG1 Meeting #99, Reno, USA, Nov. 18-22, 2019, 9 pages.

* cited by examiner

RECEPTION DEVICE, TRANSMISSION DEVICE, RECEPTION METHOD, AND TRANSMISSION METHOD

TECHNICAL FIELD

The present disclosure relates to a reception apparatus, a transmission apparatus, a reception method, and a transmission method.

BACKGROUND ART

In the standardization of 5G, New Radio access technology (NR) was discussed in 3GPP and the Release 15 (Rel. 15) specification for NR was published.

For 5G NR, in Rel. 15, a timing at which an action in accordance with a control command transmitted in a MAC Control Element (MAC CE) is started (this action is hereinafter referred to as "MAC CE action") (this timing is hereinafter referred to as "MAC CE action start timing") is specified in the standard. The MAC CE is information/a signal that is processed (transmitted) in the Medium Access Control layer.

Further, in NR, extension to Non-Terrestrial Networks (NTNs) such as communications using a satellite and/or a high-altitude pseudolite (High-altitude platform station (HAPS)) is considered (e.g., see Non-Patent Literature (hereinafter referred to as "NPL") 1).

A communication distance between a base station and a terminal is longer in the NTN system than in a terrestrial cellular system, and is thus suffered from a larger propagation delay.

CITATION LIST

Non-Patent Literature

NPL 1
3GPP, TR38.821 V16.0.0 "Solutions for NR to support non-terrestrial networks (NTN) (Release 16)"

SUMMARY OF INVENTION

Technical Problem

The MAC CE action start timing in the NTN has not yet been specified in the standard. Note that, since the NTN is suffered from a large propagation delay, it is not always optimal to configure the same MAC CE action start timing in the NTN as that in the NR.

One aspect of the present disclosure facilitates to provide a transmission apparatus, a reception apparatus, a transmission method, and a reception method capable of realizing appropriate MAC CE action start timing control processing in an NTN system.

Solution to Problem

A reception apparatus according to one aspect of the present disclosure includes: reception circuitry, which, in operation, receives a MAC Control Element (MAC CE) and an offset value; and control circuitry, which, in operation, configures, based on the offset value, a slot in which an action based on a control command of the MAC CE is started.

A transmission apparatus according to one aspect of the present disclosure includes: control circuitry, which, in operation, configures, based on an offset value, a slot in which an action based on a control command of a MAC Control Element (MAC CE) is started; and transmission circuitry, which, in operation, transmits the offset value and the MAC CE.

A reception method according to one aspect of the present disclosure includes steps performed by a reception apparatus of: receiving a MAC Control Element (MAC CE) and an offset value; and configuring, based on the offset value, a slot in which an action based on a control command of the MAC CE is started.

A transmission method according to one aspect of the present disclosure includes steps performed by a transmission apparatus of: configuring, based on an offset value, a slot in which an action based on a control command of a MAC Control Element (MAC CE) is started; and transmitting the offset value and the MAC CE.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

Advantageous Effects of Invention

According to one aspect of the present disclosure, it is possible to realize appropriate MAC CE action start timing control processing in an NTN system.

Additional benefits and advantages of one aspect of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
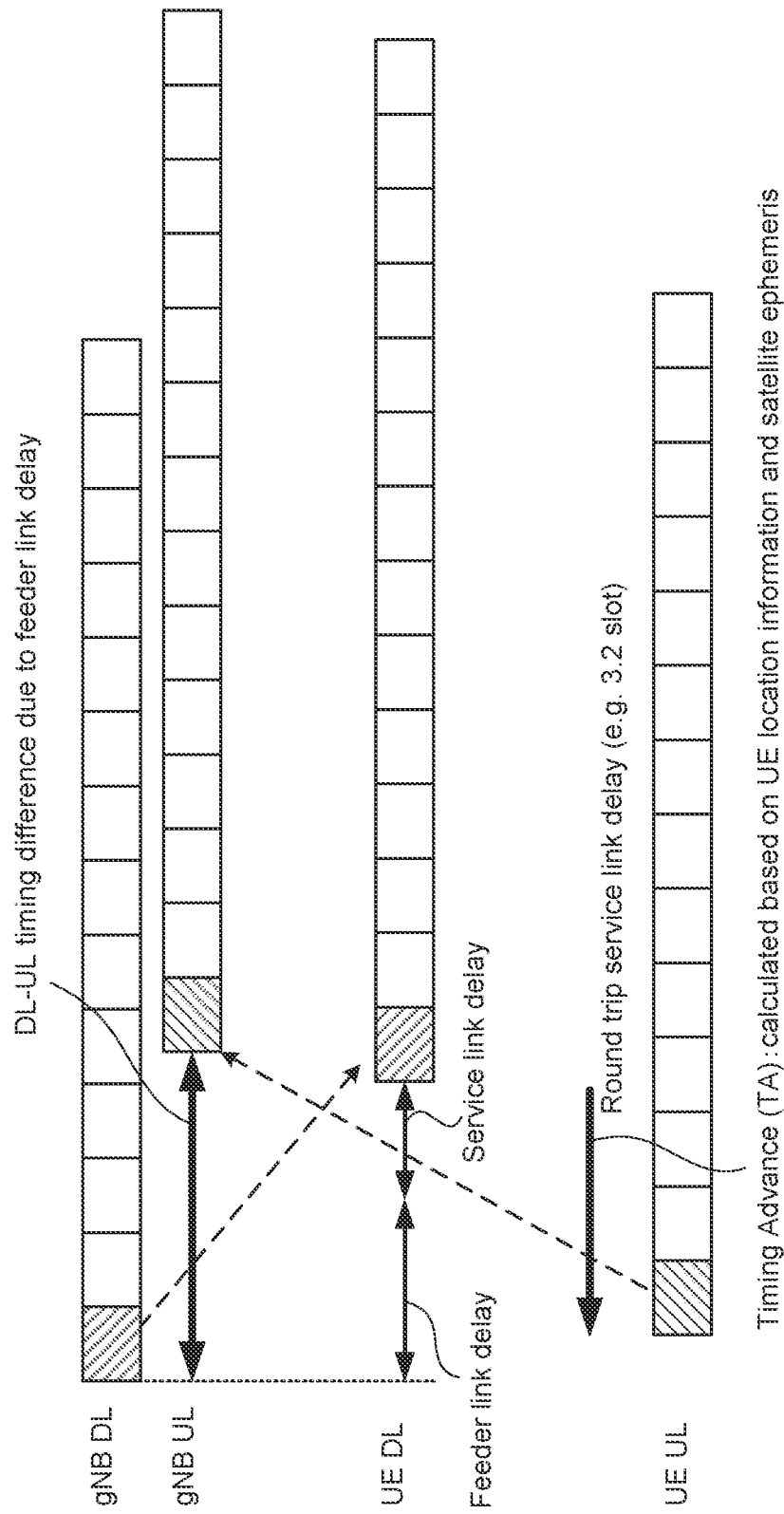
FIG. 1 illustrates one example of timing adjustment based on terminal location information and satellite orbital information.

Hereinafter, embodiments of the present disclosure will be described in detail with reference to the accompanying drawings.

Findings Leading to Present Disclosure

Hereinafter, findings leading to the present disclosure will be described.

[MAC CE Action Start Timing in NR]

In radio communication systems such as an NR, a terminal (also called a User Equipment (UE)) performs a Timing Advance control for alignment with a downlink timing for a base station (also called gNB). For example, the terminal adjusts a transmission timing of an uplink signal based on a TA value included in a TA command received from the base station. Note that uplink channels include a Physical Uplink Shared Channel (PUSCH) used for transmission of data, a Physical Uplink Control Channel (PUCCH) used for transmission of control information, and a Physical Random Access Channel (PRACH) used for transmission of initial access. In addition, uplink signals include a Sounding Reference Signal (SRS). Note also that downlink channels include a Physical Downlink Shared Channel (PDSCH) used for transmission of data and a Physical Downlink Control Channel (PDCCH) used for transmission of control information.

For 5G NR, in Rel. 15, a timing of a transmission slot is specified.

Further, for 5G NR, in Rel. 15, control commands transmitted in the MAC CE are specified. Examples of the control commands include TCI states (beam) activation/deactivation. CSI-RS resource activation/deactivation. SRS activation/deactivation, and the like as described in TS38.321V15.8.0. After confirming that the MAC CE is received by the terminal, the base station starts a MAC CE action, that is, starts to apply the control command transmitted in the MAC CE.

In a Hybrid Automatic Repeat request (HARQ) process, the terminal transmits, to the base station, a response signal (hereinafter, referred to as "HARQ-ACK") in response to a PDSCH. The response signal includes a positive acknowledgement (Acknowledgement, ACK) or a negative acknowledgement (Negative Acknowledgement, NACK).

For 5G NR, in Rel. 15, for example, TS38 213 V15.8.0 specifies, as the MAC CE action start timing, i.e., as a timing for applying the content of the control command of the notified MAC CE, a timing 3 ms after the timing at which the base station receives a HARQ-ACK for the PDSCH including the MAC CE. Since the subframe length is 1 ms, the MAC CE action start timing is 3 $N_{slot}^{subframe}$ slots after the HARQ-ACK slot. Note that "$N_{slot}^{subframe}$" denotes the number of slots per subframe and varies depending on a subcarrier spacing and the like. Accordingly, the base station can start the MAC CE action after receiving the HARQ-ACK (positive acknowledgment), i.e., after confirming that the MAC CE is correctly received by the terminal.

[Extension to NTN]

In NR, extension to NTN such as communications using a satellite and/or a HAPS is considered (e.g., see Non-Patent Literature (hereinafter referred to as "NPL") 1).

In an NTN environment, a satellite's coverage area (e.g., one or more cells) for a terrestrial terminal or a terminal on an aircraft is formed by beams from the satellite. In addition, the round-trip time of radio wave propagation between the terminal and the satellite is determined by the altitude of the satellite (e.g., up to about 36,000 km) and/or the angle viewed from the terminal, i.e., the positional relationship between the satellite and the terminal. Further, when the base station is disposed on the ground GW (Gateway), the round-trip time of radio wave propagation between the base station and the terminal is obtained by further adding the round-trip time of the radio wave propagation between the satellite and the ground GW to the round-trip time between the base station and the terminal.

For example, the satellite forms a cell with a diameter of several 100 km. The cell formed by the satellite is larger than a cell with a diameter of several km formed by the base station on ground GW or the like. Accordingly, the difference in the propagation delay of propagation between the terminal and the satellite is larger depending on the position of the terminal existing in the cell formed by the satellite.

For example, NPL 1 describes that in an NTN, the Round Trip Time (RTT) of radio wave propagation between a base station and a terminal is about 540 ms. In addition, NPL 1 describes that a maximum delay difference of about 10 ms is caused depending on the position of the terminal within beams (within a cell). The maximum delay difference indicates, for example, a difference between, on one hand, the round-trip time between a terminal at the farthest position from the satellite and the satellite and, on the other hand, the round-trip time between a terminal at the nearest position from the satellite and the satellite within the beams (within the cell).

For example, in the NTN, it is considered that the terminal calculates the propagation delay based on the distance between the terminal and the satellite estimated using the location information of the terminal obtained by a Global Navigation Satellite System (GNSS) such as a Global Positioning System (GPS) and the location information of the satellite obtained from the orbital information of the satellite (satellite ephemeris), and that the terminal autonomously performs timing adjustment.

FIG. 1 illustrates exemplary timing adjustment based on the location information of the terminal (UE location information) and the orbital information of the satellite (satellite ephemeris).

FIG. 1 illustrates downlink (DL) transmission slots and uplink (UL) reception slots for the base station (gNB), and DL reception slots and UL transmission slots for the terminal (UE). Note that, the horizontal axis of FIG. 1 represents the time axis.

FIG. 1 illustrates that a propagation delay between a transmission timing of a signal at the base station and a reception timing of the signal at the terminal is represented by a propagation delay in a feeder link (Feeder link delay) and a propagation delay in a service link (Service link delay). FIG. 1 also illustrates that the terminal adjusts the transmission timing of the signal using the TA determined based on the location information of the terminal and the orbital information of the satellite. In FIG. 1, the TA corresponds to twice the propagation delay in the service link, for example.

However, in the timing adjustment by the terminal based on the distance between the satellite and the terminal, the delay between the terminal and the satellite (i.e., the service link) is corrected, but the delay between the base station disposed on ground GW (Gateway) and the satellite (i.e., the feeder link) is not corrected. Further, in case that the satellite and the terminal are in a Non Line-of-Sight (NLOS) environment, the propagation delay calculated using the location information may differ from an actual propagation delay including applications and/or diffractions occurring in the NLOS environment. Therefore, there is a possibility that a downlink-uplink timing difference occurs as illustrated in FIG. 1.

[Study on MAC CE Action Start Timing in NTN]

Figure 2:
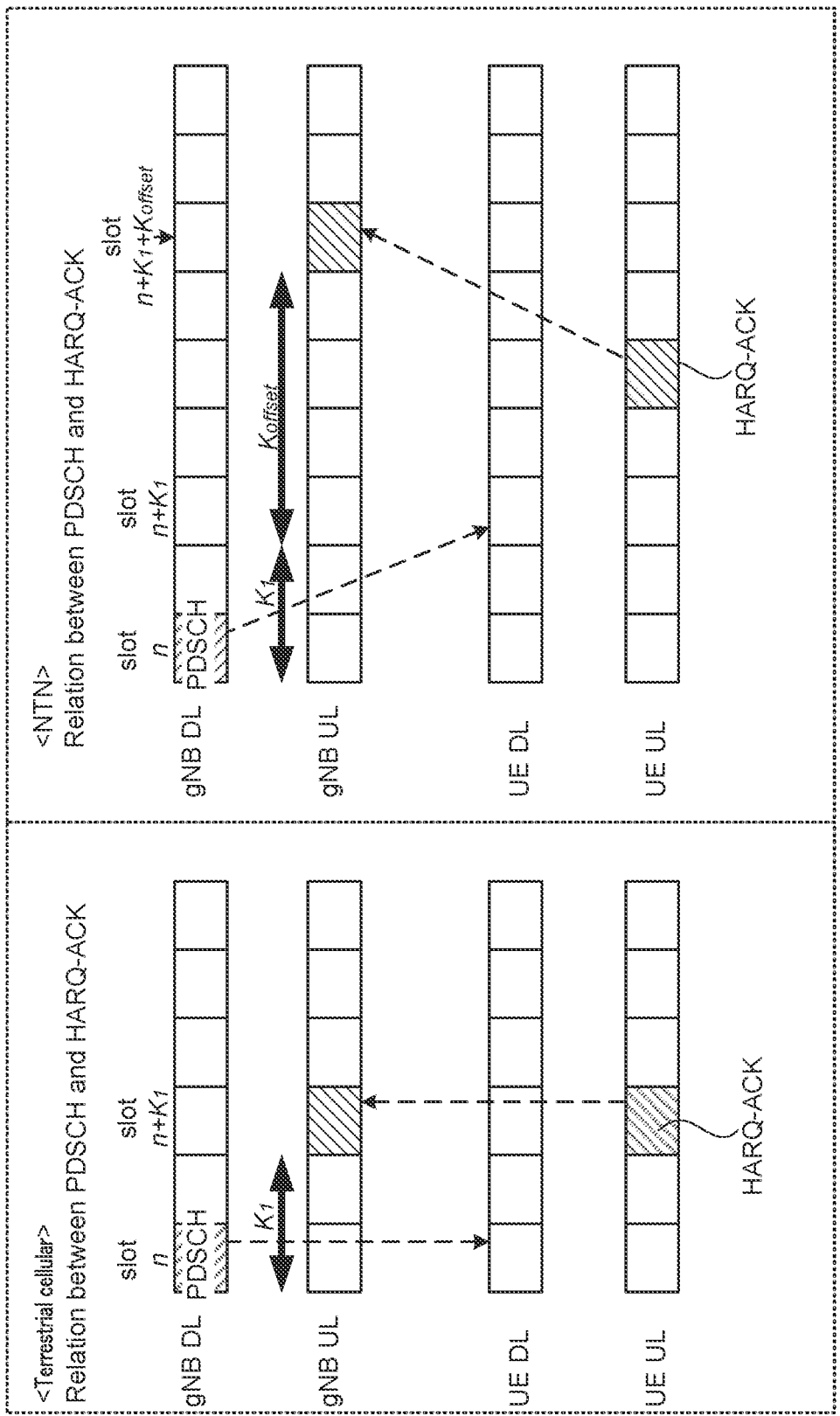
FIG. 2 illustrates one example of a transmission slot timing.

FIG. 2 illustrates an example of transmission slot timings. FIG. 2 illustrates an example of a transmission slot timing for a terrestrial cellular specified in Rel. 15 (left diagram in FIG. 2) and an example of a transmission slot timing considered for the NTN (right diagram in FIG. 2).

FIG. 2 illustrates DL transmission slots and UL reception slots for the base station (gNB), and DL reception slots and UL transmission slots for the terminal (UE). Note that, the horizontal axis of FIG. 2 represents the time axis.

In Rel. 15, a HARQ-ACK for a PDSCH transmitted in a slot (n) is transmitted by the terminal in a slot (n+$K_1$) and received by the base station. Note that, "$K_1$" is a slot correction value for the HARQ-ACK. The slot number is configured based on the slot timing for the base station.

Unlike this, for the NTN, it is considered that an offset value ($K_{offset}$) for correcting a long propagation delay is added, and the HARQ-ACK for the PDSCH is transmitted in the slot (n) by the terminal such that the HARQ-ACK is received in the slot (n+$K_1$+$K_{offset}$) by the base station. Note that, $K_{offset}$ is notified for each cell.

Figure 3:
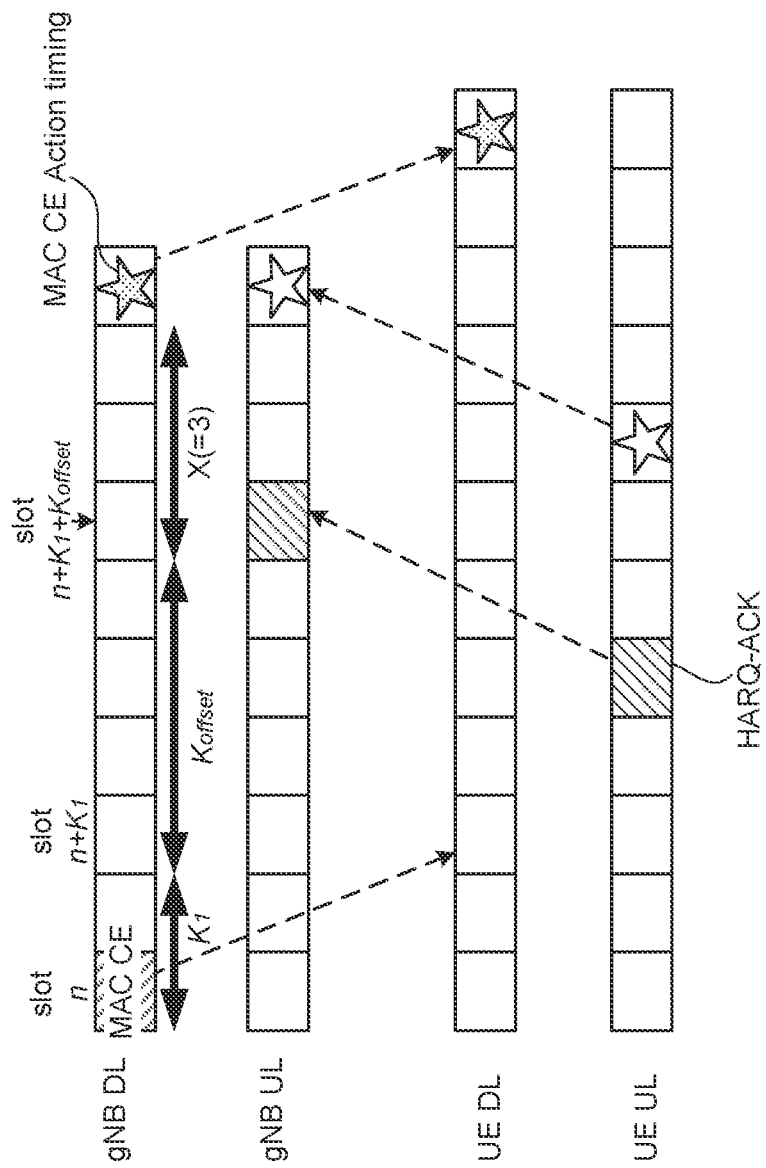
FIG. 3 illustrates study on a MAC CE action start timing.
Figure 4:
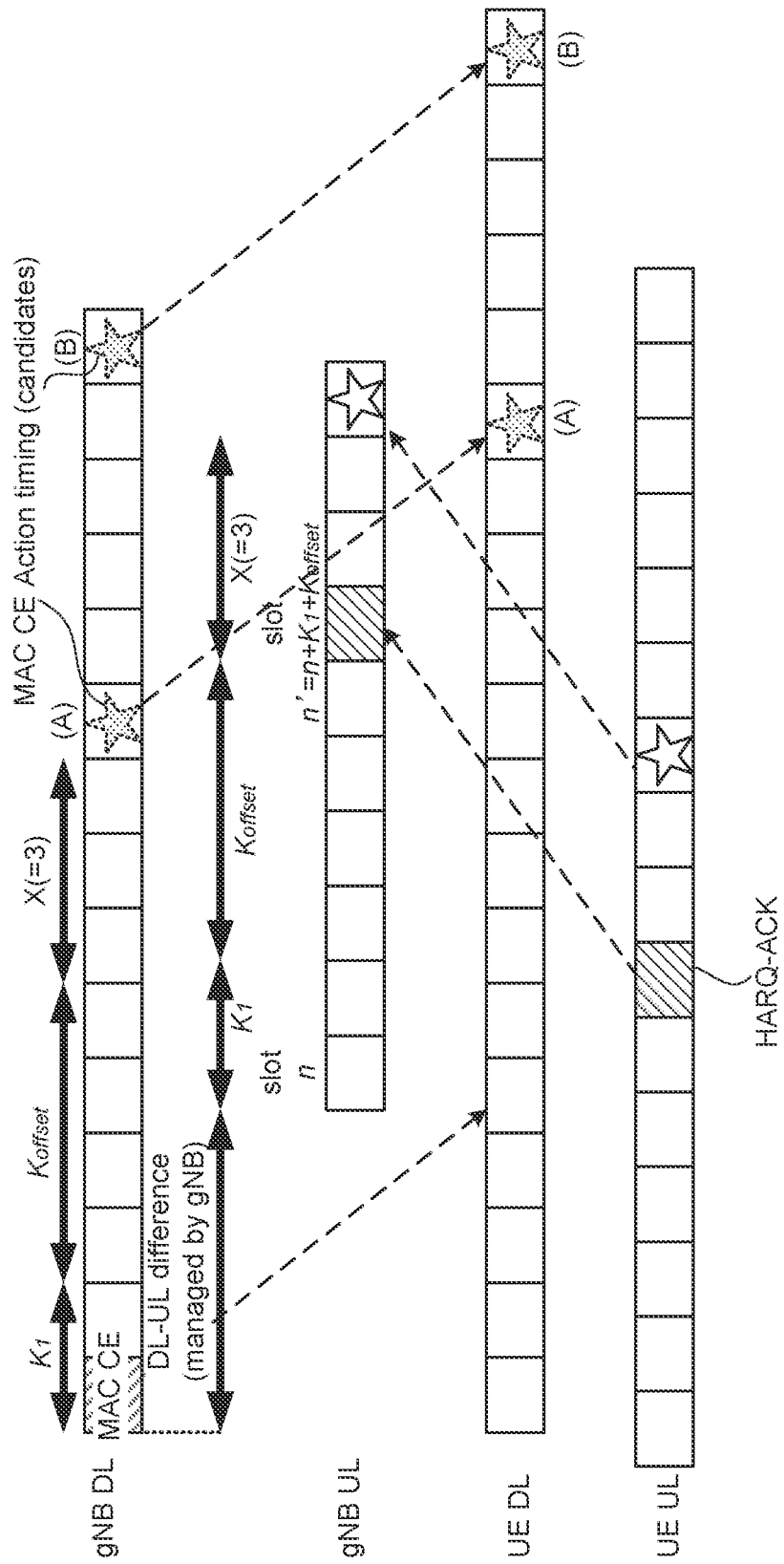
FIG. 4 illustrates study on the MAC CE action start timing.

FIGS. 3 and 4 are diagrams for explaining study on the MAC CE action start timing. FIGS. 3 and 4 illustrate DL transmission slots and UL reception slots for the base station (gNB), and DL reception slots and UL transmission slots for the terminal (UE). The horizontal axis in FIGS. 3 and 4 represents the time axis. In FIGS. 3 and 4, "X" denotes $3N_{slot}^{subframe}$.

Considering $K_{offset}$, a slot (hereinafter, referred to as "MAC CE action slot") for starting the MAC CE action with respect to the slot (n) transmitting the PDSCH including the MAC CE (hereinafter, referred to as "PDSCH slot") is the slot (n+$K_1$+$K_{offset}$+$3N_{slot}^{subframe}$) (a slot with a star mark in FIG. 3). Since n'=n+$K_1$+$K_{offset}$, the MAC CE action slot with respect to the slot (hereinafter, referred to as "HARQ-ACK slot") (n') in which the HARQ-ACK is transmitted by the terminal and received by the base station is a slot (n'+$3N_{slot}^{subframe}$).

In case that a downlink-uplink timing difference exists, and the MAC CE action slot is configured to the slot (n+$K_1$+$K_{offset}$+$3N_{slot}^{subframe}$) (slot (A) with a star mark in FIG. 4) in both the downlink and the uplink, the MAC CE action is started for the downlink before the HARQ-ACK is received.

Further, in case that a downlink MAC CE action slot is a slot immediately after the HARQ-ACK slot (slot (B) with a star mark in FIG. 4)), the terminal is not aware of the downlink-uplink timing difference, and is thus incapable of recognizing an accurate MAC CE action start timing.

The present disclosers have focused on this problem and have arrived at the present disclosure. One aspect of the present disclosure is described in connection with a technique for implementing appropriate MAC CE action start timing control processing in an NTN system.

Embodiment 1

[Overview of Communication System]

A communication system according to an embodiment of the present disclosure includes terminal 100 and base station 200. In the following description, base station 200 (corresponding to the transmission apparatus) transmits a PDSCH including a MAC CE, and terminal 100 (corresponding to the reception apparatus) receives the PDSCH. Terminal 100 transmits a HARQ-ACK for the PDSCH, and base station 200 receives the HARQ-ACK. Terminal 100 starts an uplink MAC CE action after transmitting the HARQ-ACK (positive acknowledgment). Base station 200 starts a downlink MAC CE action after receiving the HARQ-ACK (positive acknowledgment).

Figure 5:
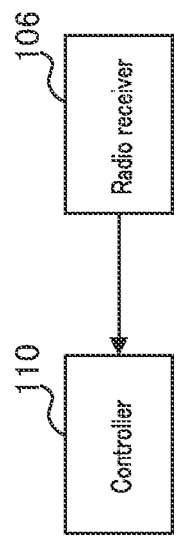
FIG. 5 is a block diagram illustrating a configuration of a part of a terminal according to Embodiment 1.

FIG. 5 is a block diagram illustrating a configuration of a part of terminal 100 according to the embodiment of the present disclosure. In terminal 100 illustrated in FIG. 5, radio receiver 106 receives the MAC CE and an offset value ($K_{MAC\_ACTION}$ or the like) from base station 200. Controller 110 configures, based on the offset value, a slot in which an action based on a MAC CE control command is started.

Figure 6:
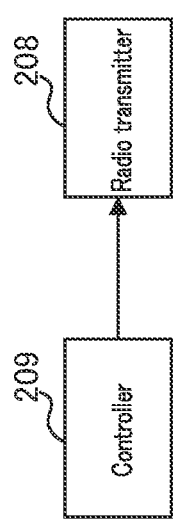
FIG. 6 is a block diagram illustrating a configuration of a part of a base station according to Embodiment 1.

FIG. 6 is a block diagram illustrating a configuration of a part of base station 200 according to an embodiment of the present disclosure. In base station 200 illustrated in FIG. 6, controller 209 configures, based on the offset value ($K_{MAC\_ACTION}$ or the like), a slot in which an action based on the MAC CE control command is started. Radio transmitter 208 transmits the MAC CE and the offset value to terminal 100.

[Configuration of Terminal]

Figure 7:
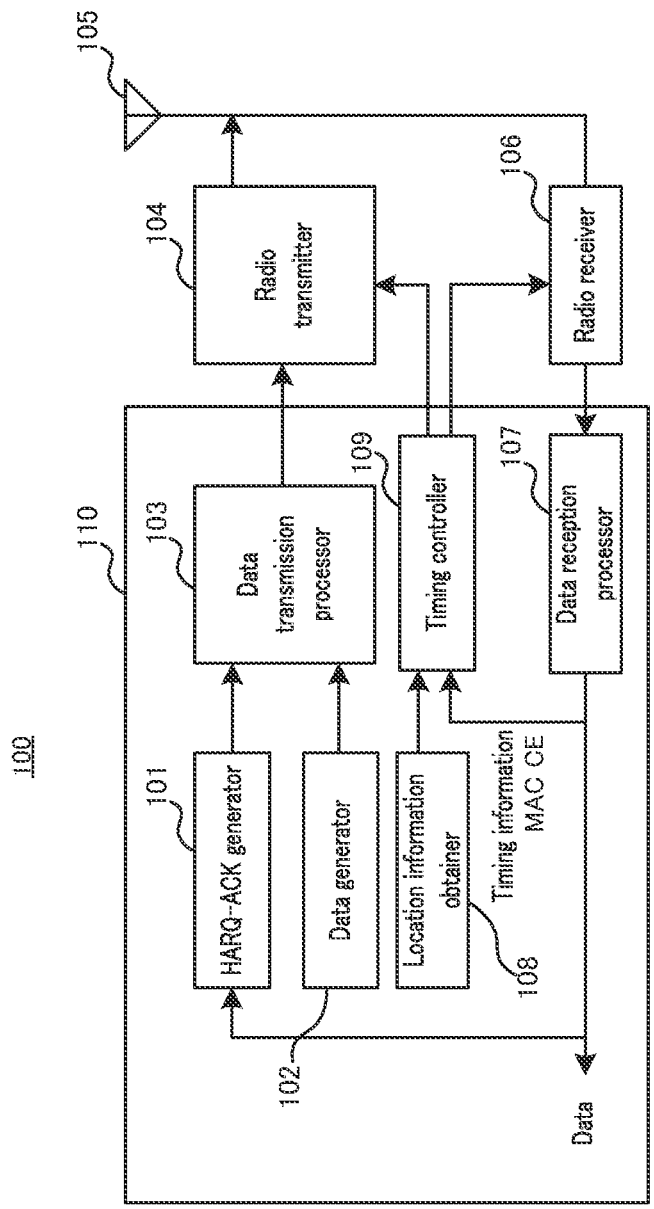
FIG. 7 is a block diagram illustrating one example of a configuration of the terminal according to Embodiment 1.

FIG. 7 is a block diagram illustrating one example of the configuration of terminal 100 according to present Embodiment 1. Terminal 100 includes HARQ-ACK generator 101, data generator 102, data transmission processor 103, radio transmitter 104, antenna 105, radio receiver 106, data reception processor 107, location information obtainer 108, and timing controller 109. HARQ-ACK generator 101, data generator 102, data transmission processor 103, data reception processor 107, location information obtainer 108, and timing controller 109 may be included in controller 110.

HARQ-ACK generator 101 generates a response signal (e.g., an ACK/NACK signal sequence) for a received PDSCH based on an error detection result inputted from data reception processor 107. HARQ-ACK generator 101 outputs the response signal to data transmission processor 103.

Data generator 102 generates an uplink data signal to be transmitted with time/frequency resources for data transmission assigned by base station 200 and a Modulation and Coding Scheme (MCS). There are a case where the time/frequency resources and the MCS are notified in downlink control information (DCI or PDCCH) and a case where the time/frequency resources and the MCS are notified by RRC signaling (Configured grant). Data generator 102 outputs the uplink data signal to data transmission processor 103.

Data transmission processor 103 performs encoding processing and modulation processing on each of the response signal outputted by HARQ-ACK generator 101 and the uplink data signal outputted by data generator 102, and outputs the modulated baseband uplink signal to radio transmitter 104.

Radio transmitter 104 performs transmission processing such as D/A conversion and up-conversion on the baseband uplink signal outputted by data transmission processor 103, and transmits the uplink signal of a radio frequency obtained by the transmission processing to base station 200 via antenna 105. Further, radio transmitter 104 adjusts a transmission timing of the uplink signal according to an indication from timing controller 109.

Radio receiver 106 performs reception processing such as down-conversion and A/D conversion on a downlink signal of a radio frequency as received from base station 200 via antenna 105, and outputs the baseband downlink signal obtained by the reception processing to data reception processor 107. Further, radio receiver 106 adjusts the reception timing of the downlink signal according to an indication from timing controller 109.

Data reception processor 107 performs demodulation and decoding processing on the downlink signal outputted by radio receiver 106 to obtain downlink data and downlink control information. Data reception processor 107 may perform channel estimation and timing estimation based on a received reference signal. In addition, data reception processor 107 outputs, to timing controller 109, timing information (e.g., a common TA, specific TA, and offset value) included in the demodulated and decoded downlink control information, or, MAC CE control information. The PDCCH of the downlink signal includes PDSCH assignment information, PUSCH assignment information, and the like. The PDSCH of the downlink signal may include RRC control information, MAC CE control information, a RACH response (msg2), TA command, and the like in addition to user data.

Location information obtainer 108 obtains the location information (information such as latitude, longitude, and altitude) on the location of terminal 100 and the location information on the location of the satellite being a communication partner by a GNSS function such as GPS, calculates the distance between terminal 100 and the satellite, and outputs distance information indicating the calculated distance to timing controller 109. Note that, location information obtainer 108 may obtain the location information on the satellite by obtaining orbital information called satellite ephemeris and time information in advance.

Timing controller 109 calculates a propagation delay time based on the distance information outputted by location information obtainer 108 and based on a radio wave propagation speed (about $3\times10^8$ m/s). Then, based on the propagation delay time, a timing adjustment value common to the cell that is broadcast by the base station, the TA value for terminal 100 notified by the base station, and the like, timing controller 109 indicates the transmission timing of the uplink signal to radio transmitter 104 and indicates the reception timing of the downlink signal to radio receiver 106. The timing adjustment value may differ depending on channels (e.g., PUSCH, PUCCH, PRACH, and SRS).

Timing controller 109 controls each section to start the MAC CE action at a predetermined timing based on the offset value when the MAC CE control information is inputted from data reception processor 107. The configuration method for configuring the MAC CE action start timing will be described in detail later.

[Configuration of Base Station]

Figure 8:
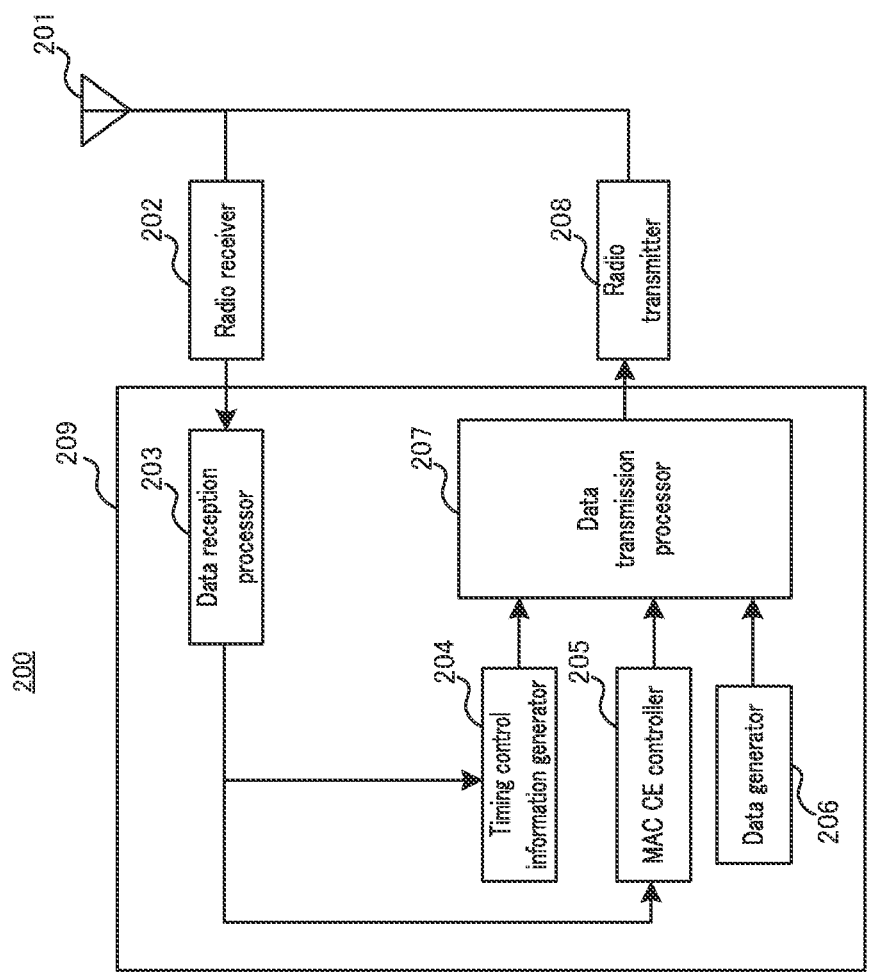
FIG. 8 is a block diagram illustrating one example of a configuration of the base station according to Embodiment 1.

FIG. 8 is a block diagram illustrating one example of the configuration of base station 200 according to the present embodiment. Base station 200 includes antenna 201, radio receiver 202, data reception processor 203, timing control information generator 204, MAC CE controller 205, data generator 206, data transmission processor 207, and radio transmitter 208. Data reception processor 203, timing control information generator 204, MAC CE controller 205, data generator 206, and data transmission processor 207 may be included in controller 209.

Radio receiver 202 performs reception processing such as downconversion, A/D conversion, and/or the like on a downlink signal of a radio frequency as received from terminal 100 via antenna 201, and outputs a baseband uplink signal obtained by the reception processing to data reception processor 203.

Data reception processor 203 performs demodulation and decoding processing on an uplink signal outputted by radio receiver 202 to obtain downlink data and downlink control information. Further, data reception processor 203 performs channel estimation and timing estimation based on the received data signal, and outputs timing information indicating the estimated timing to timing control information generator 204. Data reception processor 203 also outputs the received HARQ-ACK to MAC CE controller 205.

Timing control information generator 204 generates a TA command for terminal 100 based on the timing estimated by data reception processor 203. Further, timing control information generator 204 generates a timing adjustment value and an offset value ($K_{offset}$, $K_{MAC\_ACTION}$, or the like) common to the cell. The timing adjustment value and offset value common to the cell are generated based on, for example, the sizes of the cells formed by satellite beams and based on the length and delay amount of a feeder link. Timing control information generator 204 outputs the timing control information to data transmission processor 207.

MAC CE controller 205 generates a MAC CE and outputs it to data transmission processor 207. MAC CE controller 205 controls each section to start the MAC CE action at a predetermined timing based on the offset value, for example, when a HARQ-ACK (positive acknowledgement) for a PDSCH including the MAC CE is inputted from data reception processor 203. The configuration method for configuring the MAC CE action start timing will be described in detail later.

Data generator 206 generates a downlink data signal including user data, system information, specific control information, and the like. Data generator 206 outputs the generated downlink data signal to data transmission processor 207.

Data transmission processor 207 performs encoding processing and modulation processing on each of the timing control information outputted by timing control information generator 204, the MAC CE outputted by controller 205, and the downlink data signal outputted by data generator 206, maps the modulated baseband downlink signal to the radio resource, and outputs the signal to radio transmitter 208.

Radio transmitter 208 performs transmission processing such as D/A conversion and up-conversion on the baseband downlink signal outputted by data transmission processor 207, and transmits the downlink signal of a radio frequency obtained by the transmission processing to terminal 100 via antenna 201.

[Configuration Method for MAC CE Action Start Timing]

Next, a detailed description will be given of a configuration method for configuring the MAC CE action start timing according to the present embodiment.

·Configuration Method 1-1

Figure 9:
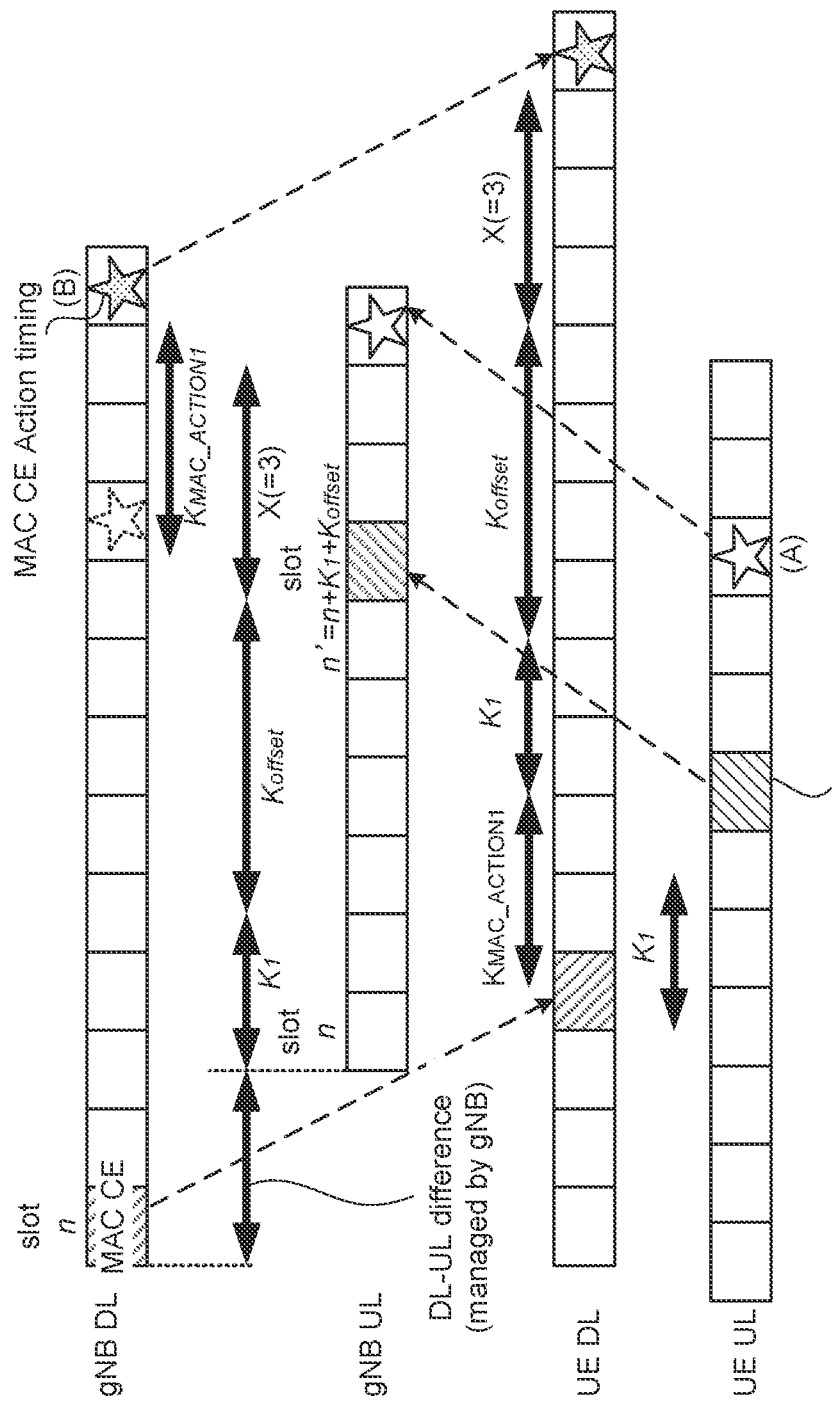
FIG. 9 illustrates configuration method 1-1 for configuring a MAC CE action slot according to Embodiment 1.

FIG. 9 illustrates configuration method 1-1 for configuring the MAC CE action slot. FIG. 9 illustrates DL transmission slots and UL reception slots for the base station (gNB), and, DL reception slots and UL transmission slots for the terminal (UE). Note that, the horizontal axis of FIG. 9 represents the time axis.

In the present method, a downlink MAC CE action slot is configured with reference to an uplink MAC CE action slot based on an offset value ($K_{MAC\_ACTION1}$) notified by base station 200 to terminal 100.

Base station 200 notifies the offset value ($K_{MAC\_ACTION1}$) in consideration of the downlink-uplink timing difference, for example, at the time point of transmitting the MAC CE. Note that $K_{MAC\_ACTION1}$ has a granularity in units of slot, and the downlink-uplink timing difference is rounded up in units of slot length. Base station 200 may transmit $K_{MAC\_ACTION1}$ in a subject MAC CE, or may transmit it in another MAC CE, RRC signaling, DCI, or the like.

Terminal 100 and base station 200 configure the uplink MAC CE action slot (slot (A) with a star mark in FIG. 9) with reference to the HARQ-ACK slot. The uplink MAC CE action slot for the HARQ-ACK slot (n') is the slot (n'+ $3N_{slot}^{subframe}$). (In the case of X=3)

Further, terminal 100 and base station 200 configure, as the downlink MAC CE action slot (slot (B) with a star mark in FIG. 9), a slot that is offset by the offset value ($K_{MAC\_ACTION1}$) from the uplink MAC CE action slot. Therefore, the downlink MAC CE action slot for the HARQ-ACK slot (n') is the slot (n'+$3N_{slot}^{subframe}$+$K_{MAC\_ACTION1}$).

The relation between the PDSCH slot (n) and the HARQ-ACK slot (n') is n'=n+$K_1$+$K_{offset}$. Therefore, the uplink MAC CE action slot for the PDSCH slot (n) is the slot (n+ $3N_{slot}^{subframe}$+$K_1$+$K_{offset}$). In addition, the downlink MAC CE action slot for the PDSCH slot (n) is the slot (n+ $3N_{slot}^{subframe}$+$K_1$+$K_{offset}$+$K_{MAC\_ACTION1}$). In other words, the offset notified, $K_{MAC\_ACTION1}$, is used only for specifying the downlink MAC CE action slot timing, and not for specifying the uplink MAC CE action slot timing.

According to the present method, terminal 100 can accurately grasp the start timing (slot) for the downlink MAC CE action even when there is a downlink-uplink timing difference. It is thus possible to prevent occurrence of a discrepancy in the transmission/reception parameters and the like between base station 200 and terminal 100. Further, appropriate configuration of $K_{MAC\_ACTION1}$ allows base station 200 to have adequate time before starting the MAC CE action after base station 200 receives the HARQ-ACK (positive acknowledgement). Thus, terminal 100 is capable of starting the MAC CE action after confirming that the terminal receives the MAC CE correctly. Further, base station 200 can configure the same timing or close timings between the downlink MAC CE action start timing and the uplink MAC CE action start timing. Thus, it is possible to simplify the control in base station 200.

In the present method, $K_{MAC\_ACTION1}$ need not necessarily be configured to a value corresponding to the downlink-uplink timing difference. For example, $K_{MAC\_ACTION1}$ may be configured to a value that has a margin in consideration of the processing time at base station 200.

·Configuration Method 1-2

Figure 10:
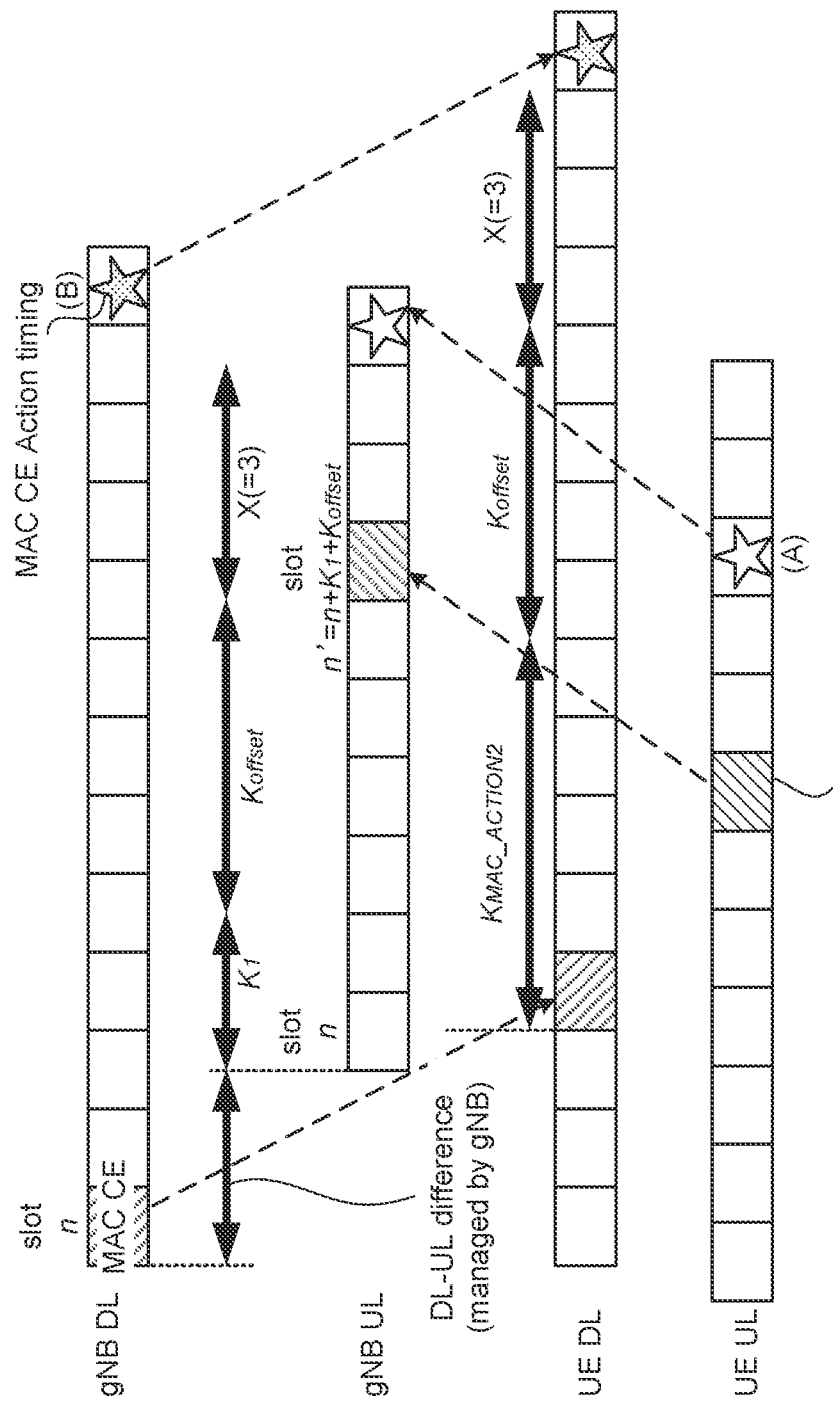
FIG. 10 illustrates configuration method 1-2 for configuring the MAC CE action slot according to Embodiment 1.

FIG. 10 illustrates configuration method 1-2 for configuring the MAC CE action slot. FIG. 10 illustrates DL transmission slots and UL reception slots for the base station (gNB), and DL reception slots and UL transmission slots for the terminal (UE). Note that, the horizontal axis of FIG. 10 represents the time axis.

In the present method, the downlink MAC CE action slot is configured with reference to the PDSCH slot based on the offset value ($K_{MAC\_ACTION2}$) notified by base station 200 to terminal 100.

Base station 200 notifies, as $K_{MAC\_ACTION2}$, an offset value corresponding to the downlink-uplink timing difference at the time point of transmitting the MAC CE plus the correction value ($K_1$).

Terminal 100 and base station 200 configure the uplink MAC CE action slot (slot (A) with a star mark in FIG. 10) with reference to the PDSCH slot. The uplink MAC CE action slot for the HARQ-ACK slot (n') in response to the PDSCH including the MAC CE is the slot (n'+ $3N_{slot}^{subframe}$), and the uplink MAC CE action slot for the PDSCH slot (n) is the slot (n+$3N_{slot}^{subframe}$+$K_{offset}$+$K_1$). (In the case of X=3)

Terminal 100 and base station 200 configure the downlink MAC CE action slot (slot (B) with a star mark in FIG. 10) with reference to the PDSCH slot. The downlink MAC CE action slot for the PDSCH slot (n) is the slot (n+ $3N_{slot}^{subframe}$+$K_{offset}$+$K_{MAC\_ACTION2}$). Therefore, terminal 100 can configure the downlink MAC CE action slot without considering the correction value ($K_1$) of the HARQ-ACK timing.

According to the present method, terminal 100 can accurately grasp the start timing (slot) for the downlink MAC CE action. It is thus possible to prevent occurrence of a discrepancy in the transmission/reception parameters and the like between base station 200 and terminal 100. Further, appropriate configuration of $K_{MAC\_ACTION2}$ allows base station 200 to have adequate time before starting the MAC CE action after base station 200 receives the HARQ-ACK (positive acknowledgement). Thus, terminal 100 is capable of starting the MAC CE action after confirming that the terminal receives the MAC CE correctly. Further, base station 200 can configure the same timing or close timings between the downlink MAC CE action start timing and the uplink MAC CE action start timing. Thus, it is possible to simplify the control in base station 200.

Further, the MAC CE action slot is specified with reference to the PDSCH slot in each of the uplink and the downlink. Thus, terminal 100 can identify each MAC CE action slot independently. It is thus possible to simplify the processing.

In the present method. $K_{MAC\_ACTION2}$ need not necessarily be configured to a value corresponding to the value of the downlink-uplink timing difference and the correction value ($K_1$) added together. For example, $K_{MAC\_ACTION2}$ may be configured to a value that has a margin in consideration of the processing time at base station 200.

Effects

In present Embodiment 1 described above, it is possible to prevent occurrence of a discrepancy in the transmission/reception parameters and the like between base station 200 and terminal 100. Further, base station 200 can start the MAC CE action after confirming that terminal 100 correctly receives the MAC CE. Thus, according to Embodiment 1, it is possible to realize appropriate MAC CE action start timing control processing in the NTN system.

Embodiment 2

In present Embodiment 2, a case will be described in which the base station starts the downlink MAC CE action without waiting for reception of a HARQ-ACK slot. Note that the configurations of the terminal and the base station in the present embodiment are the same as those of terminal 100 and base station 200 described in Embodiment 1, and therefore, description thereof is omitted.

[Configuration Method for MAC CE Action Start Timing]

Next, a detailed description will be given of a configuration method for configuring the MAC CE action start timing according to the present embodiment.

·Configuration Method 2-1

Figure 11:
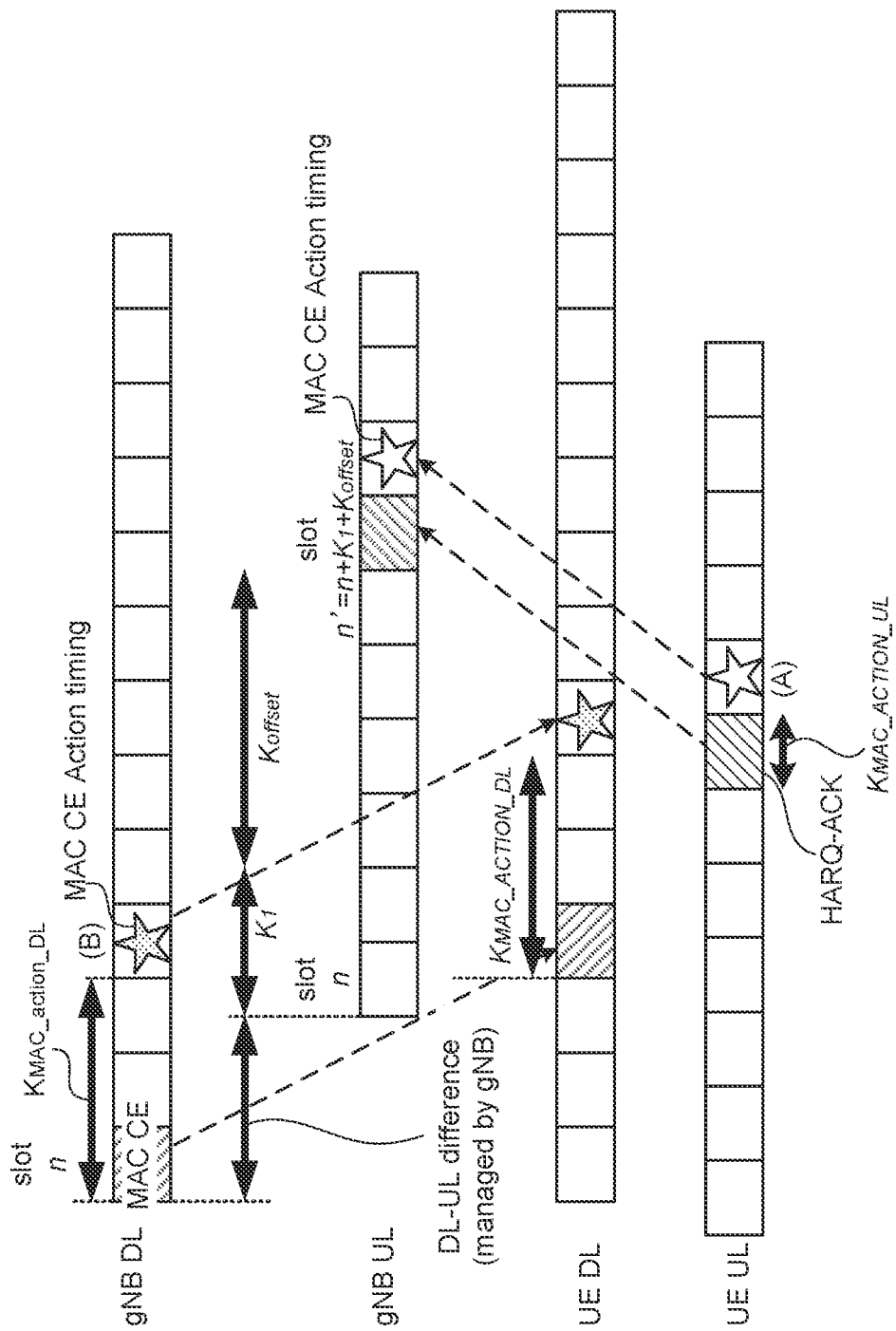
FIG. 11 illustrates configuration method 2-1 for configuring the MAC CE action slot according to Embodiment 2.

FIG. 11 illustrates configuration method 2-1 for configuring the MAC CE action slot. FIG. 11 illustrates DL transmission slots and UL reception slots for the base station (gNB), and DL reception slots and UL transmission slots for the terminal (UE). Note that, the horizontal axis of FIG. 11 represents the time axis.

In the present method, the downlink MAC CE action slot is configured with reference to a PDSCH slot based on an offset value ($K_{MAC\_ACTION\_DL}$), and the uplink MAC CE action slot is configured with reference to a HARQ-ACK slot based on an offset value ($K_{MAC\_ACTION\_UL}$).

Base station 200 notifies the uplink offset value ($K_{MAC\_ACTION\_UL}$) and the downlink offset value ($K_{MAC\_ACTION\_DL}$). Note that $K_{MAC\_ACTION\_UL}$ and/or $K_{MAC\_ACTION\_DL}$ to be used may be fixed values defined in the specifications, or values notified by the base station using a SIB or notified by terminal-specific signaling. Base station 200 may transmit $K_{MAC\_ACTION\_DL}$ in the subject MAC CE, may transmit it using the SIB and/or RRC signaling, or may transmit it in the DCI. Note that, although the same applies to $K_{MAC\_ACTION\_UL}$, it is desirable to notify $K_{MAC\_ACTION\_UL}$ using the SIB or RRC signaling because the values are dependent on the throughput of the terminal or the base station in the uplink and thus do not need to be changed frequently.

Terminal 100 and base station 200 configure the uplink MAC CE action slot (slot (A) with a star mark in FIG. 11) with reference to the HARQ-ACK slot. The uplink MAC CE action slot for the HARQ-ACK slot (n) is the slot (n'+$K_{MAC\_ACTION\_UL}$).

Terminal 100 and base station 200 configure the downlink MAC CE action slot (slot (B) with a star mark in FIG. 11) with reference to the PDSCH slot. The downlink MAC CE action slot for PDSCH slot (n) is the slot (n+$K_{MAC\_ACTION\_DL}$).

According to the present method, terminal 100 can accurately grasp the start timing (slot) for the downlink MAC CE action. It is thus possible to prevent occurrence of a discrepancy in the transmission/reception parameters and the like between base station 200 and terminal 100. Further, it is possible to start the downlink MAC CE action without waiting for reception of the HARQ-ACK slot. It is thus possible to shorten the time before the MAC CE action is started. Further, terminal 100 can configure the same timing or close timings between the downlink and uplink MAC CE action start timings. It is thus possible to simplify the timing adjustment in the terminal.

In the present method, since the range of the offset value to be notified amounts to at most several slots, it is possible to notify the offset value with several bits. Therefore, in the present method, the number of bits required for notification can be reduced as compared with configuration methods 1-1 and 1-2 in Embodiment 1 described above.

In the present method, it is possible that base station 200 starts the MAC CE action without confirming that terminal 100 receives the MAC CE correctly. However, as will be described below, this point does not result in a significant problem depending on the way of operating the NTN.

Generally, the propagation delay is extremely large in the NTN. Accordingly, in case that transmission relying on retransmission by HARQ is performed, the delay until the packet transmission is completed may become extremely long. Therefore, the initial transmission may be performed with a robust MCS (i.e., an MCS with a low modulation order and/or a low coding rate) so as to be received with a high probability (e.g., 99.99%).

Accordingly, even when base station 200 starts the downlink MAC CE action without waiting for reception of the HARQ-ACK, it is unlikely for terminal 100 to erroneously receive the MAC CE. It is thus extremely unlikely that a discrepancy occurs between base station 200 and terminal 100. Even when a discrepancy occurs (that is, an ACK is not received), base station 200 can recognize the discrepancy when the ACK is not received. It is thus possible to resolve the discrepancy by retransmitting signals transmitted after MAC CE transmission and before HARQ-ACK reception.

Further, by configuring $K_{MAC\_ACTION\_DL}$ to a large value, it is also possible to start the downlink MAC CE action at a timing later than the HARQ-ACK reception timing at base station 200. For example, when the PDSCH for transmitting the MAC CE is transmitted with a robust MCS (e.g., transmitted together with data of strict delay requirements), the PDSCH is unlikely to be erroneous. Thus, $K_{MAC\_ACTION\_DL}$ is configured to a small value and the MAC CE action is started without waiting for reception of the HARQ-ACK. On the other hand, when the PDSCH for transmitting the MAC CE is transmitted with a normal MCS (e.g., transmitted together with data allowing a delay), the PDSCH is likely to be erroneous. Thus, $K_{MAC\_ACTION\_DL}$ is configured to a large value and the MAC CE action is started after the HARQ-ACK is received. Thus, by controlling $K_{MAC\_ACTION}$_DL according to the situation, the flexible operation is possible. Further, also for $K_{MAC\_ACTION}$_UL, the base station may configure it to a large value when the base station waits for HARQ-ACK reception before starting the MAC CE action, or configure it to a small value otherwise.

Further, for example, when a MAC CE is transmitted in a HARQ process configured such that HARQ-ACK feedback is not performed, $K_{MAC\_ACTION\_DL}$ may be configured to a small value and the MAC CE action may be started prior to HARQ-ACK reception timing. When a MAC CE is transmitted in a HARQ process configured such that HARQ-ACK feedback is performed, the MAC CE action may be started after HARQ-ACK feedback. In this case, for these two types of HARQ processing, the two $K_{MAC\_ACTION\_DL}$ values may be notified to the terminal in advance. Further, a plurality of values may be notified to the terminal in advance, and the base station may designate (notify) a value to be used to the terminal each time the MAC CE is transmitted. Also for $K_{MAC\_ACTION\_UL}$, two values may be notified to the terminal in advance in the same manner as for $K_{MAC\_ACTION\_DL}$.

·Configuration Method 2-2

Figure 12:
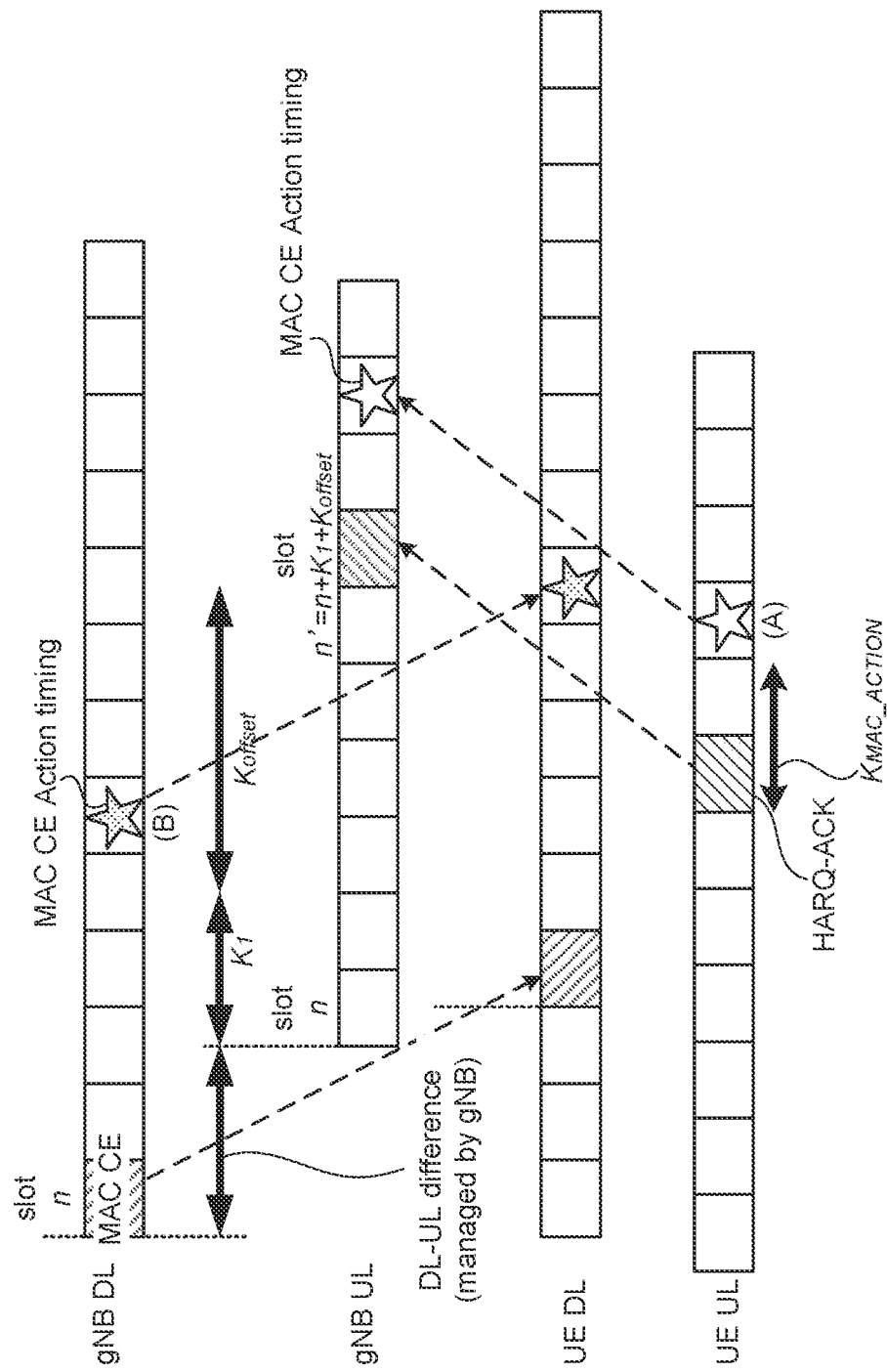
FIG. 12 illustrates configuration method 2-2 for configuring the MAC CE action slot according to Embodiment 2.

FIG. 12 illustrates configuration method 2-1 for configuring the MAC CE action slot. FIG. 12 illustrates DL transmission slots and UL reception slots for the base station (gNB), and, DL reception slots and UL transmission slots for the terminal (UE). Note that, the horizontal axis of FIG. 12 represents the time axis.

In the present method, the uplink and the downlink MAC CE action slots are configured with reference to a HARQ-ACK transmission slot of the terminal based on an offset value ($K_{MAC\_ACTION}$).

Base station 200 notifies the offset value ($K_{MAC\_ACTION}$). Base station 200 may transmit $K_{MAC\_ACTION}$ in the subject MAC CE or may transmit it in another MAC CE. Alternatively, $K_{MAC\_ACTION}$ may be a fixed value determined in accordance with the specifications, or may be a value broadcast using the SIB from base station 200 to terminal 100 or a value notified by terminal-specific signaling or DCI.

Terminal 100 and base station 200 configure, as the uplink and downlink MAC CE action slots (the slots (A) and (B) with a star mark in FIG. 12), slots delayed by $K_{MAC\_ACTION}$ from the HARQ-ACK slot. Both the uplink and downlink MAC CE action slots for the HARQ-ACK transmission slot (n') of the terminal are slots (n'+$K_{MAC\_ACTION}$). The downlink MAC CE action slot may be specified as the same slot as the uplink MAC CE action slot (n'+$K_{MAC\_ACTION}$) or the first slot after the uplink MAC CE action slot.

Base station 200 calculates the downlink MAC CE action start timing in consideration of a managed uplink-downlink timing difference and the like. For example, base station 200 calculates, as the MAC CE action start timing, n+$T_{DL-UL}$+ $K_1$+$K_{MAC\_ACTION}$. Note that "$T_{DL-UL}$" denotes the uplink-downlink timing difference rounded to units of slots. The character "n" denotes the MAC CE transmission slot.

According to the present method, terminal 100 can accurately grasp the start timing (slot) for the downlink MAC CE action. It is thus possible to prevent occurrence of a discrepancy in the transmission/reception parameters and the like between base station 200 and terminal 100. Further, it is possible to start the downlink MAC CE action without waiting for reception of the HARQ-ACK slot. It is thus possible to shorten the time before the MAC CE action is started. In addition, since only one parameter is used, the overhead in notification can be reduced. Like above configuration method 2-1, the downlink MAC CE action can be started at a timing later than the HARQ-ACK reception timing of HARQ-ACK reception at base station 200. Also, the time before the MAC CE action is started can be shortened by starting the downlink MAC CE action at a timing earlier than the HARQ-ACK reception timing. Further, terminal 100 can configure the same timing or close timings between the downlink and uplink MAC CE action start timings. It is thus possible to simplify the timing adjustment in terminal 100.

Effects

In present Embodiment 2 described above, it is possible to prevent occurrence of a discrepancy in the transmission/reception parameters and the like between base station 200 and terminal 100. Further, it is possible for base station 200 to start the downlink MAC CE action without waiting for reception of the HARQ-ACK slot. It is thus possible to shorten the time before the MAC CE action is started. Thus, according to Embodiment 2, it is possible to realize appropriate MAC CE action start timing control processing in the NTN system.

The embodiments of the present disclosure have been described above.

Note that, in the above-described embodiments, the cell may be an area defined by the reception power of a Synchronization Signal/PBCH Block (SSB) or a Channel State Information-Reference Signal (CSI-RS) transmitted by the base station (satellite), or may be an area defined by the geographical position.

Note that the embodiments described above have been described by taking the NTN environment (e.g., a satellite communication environment) as an example, but the present disclosure is not limited thereto. The present disclosure may be applied to other communication environments (e.g., a terrestrial cellular environment in LTE and/or NR).

Note that, although the above embodiments have been described in relation to the example in which the GNSS such as GPS (i.e., position detection using a satellite signal) is utilized, position detection by a terrestrial cellular base station, position detection using a WiFi signal and/or Bluetooth (registered trademark) signal, position detection using an acceleration sensor or the like, or a combination thereof may be performed. In addition, the altitude information may be obtained from a barometric pressure sensor or the like.

Note that, the cell may be an area defined by the reception power of the SSB and/or a CSI-RS transmitted by the base station (satellite), or may be an area defined by the geographical position. Further, the cell in the above embodiments may be replaced with a beam defined by the SSB.

The Satellite ephemeris information, which is information on the positions of satellites, may be notified using the system information or the like, or may be held in advance by a terminal (or a base station). Further, the terminal (or the base station) may update the Satellite ephemeris information when communication is enabled. Further, the terminal (or base station) may also use other information to identify the position of the satellite.

Note that the above embodiments have been described in connection with the case where the location information can be utilized, but for a terminal that does not have a GNSS function and/or a terminal that cannot obtain information on the location of a satellite, a timing control may be performed in accordance with timing control information common to the cell that is broadcast by a base station instead of the timing control based on the location information. In this case, the base station may transmit the timing control information corresponding to a propagation delay amount in the vicinity of the cell center.

The base station may be referred to as gNodeB or gNB. Further, the terminal may be referred to as UE.

The slot may be replaced by "time slot," "minislot," "frame," "subframe," or the like.

The response signal may be described not only as "HARQ-ACK" but also as "ACK/NACK."

In the above-described embodiments, the MAC CE action slot is 3 ms, i.e., 3 $N_{slots}^{subframe}$ slots after the HARQ-ACK slot. However, the MAC CE may be applied after a longer or shorter time, and such a time may be generalized as "after X $N_{slot}^{subframe}$ slots."

In the above embodiments, the MAC CE action start timing has been described as a timing at which an action in accordance with the control command transmitted in the MAC CE is started, but it may be a timing at which a status in accordance with the control command transmitted in the MAC CE is applied.

The uplink MAC CE in the above-described embodiments is a command relevant to the transmission or status in the uplink, and is, for example, any one of a Timing Advance Command MAC CE, SCell Activation/Deactivation MAC CE, PUCCH spatial relation Activation/Deactivation MAC CE, SP CSI reporting on PUCCH Activation/Deactivation MAC CE, SP SRS Activation/Deactivation MAC CE, SRS Pathloss Reference RS Update MAC CE, PUSCH Pathloss Reference RS Update MAC CE, and Serving Cell Set based SRS Spatial Relation Indication MAC CE. An SCell Activation/Deactivation MAC CE relevant to an uplink SCell may also be included.

The downlink MAC CE in the above-described embodiments is a command relevant to the transmission and status in the downlink, and is, for example, any one of an SCell Activation/Deactivation MAC CE. SP ZP CSI-RS Resource Set Activation/Deactivation MAC CE. TCI States Activation/Deactivation for UE-specific PDSCH MAC CE, Aperiodic CSI Trigger State Sub-selection MAC CE, SP CSI-RS/CSI-IM Resource Set Activation/Deactivation MAC CE, and DRX Command MAC CE.

Further, depending on commands, the MAC CE action timing may be changed, for example, by changing the value of X or the value of $K_{MAC\_ACTION}$. It is possible to effectuate an action at an appropriate timing according to the contents and priority of the command.

In Embodiment 1, in case that the uplink MAC CE action start timing is with reference to the HARQ-ACK timing for a PDSCH including the MAC CE (that is, the MAC CE action start timing is at slot (n'+3$N_{slot}^{subframe}$) with respect to HARQ-ACK slot n'), the uplink MAC CE action start timing is the same timing as in NR Rel. 15. For this reason, $K_{MAC\_ACTION}$ may be notified as an offset for controlling the downlink MAC CE action start timing. Also, in the same PDSCH as the downlink MAC CE, $K_{MAC\_ACTION}$ may be notified as the same MAC CE or as a difference MAC CE.

In the above-described embodiments, although offset value $K_{MAC\_ACTION}$ indicating a MAC CE application timing (including $K_{MAC\_ACTION1}$, $K_{MAC\_ACTION2}$, and the like) is notified, only a difference from a separately notified value, for example, an offset value broadcast within a cell in order to correct a round-trip delay may be notified. The offset value for correcting the round-trip delay may be an offset value used for Timing Advance or may be $K_{offset}$ described above.

Offset value $K_{MAC\_ACTION}$ indicating the MAC CE application timing may be broadcast using the SIB or the like as a value common to the cell and/or beam, or may be notified by specific RRC signaling. Such an offset value may also be notified as a MAC CE, or may be notified in the DCI (or PDCCH).

In the case of GEO (geostationary satellite), the downlink-uplink timing difference is a constant value (or a value that hardly changes), while in the case of LEO (non-geostationary satellite), the downlink-uplink timing difference changes with the movement of the satellite. For this reason, the offset value is notified using the SIB or RRC signaling in the case of GEO, while $K_{MAC\_ACTION}$ calculated by the base station is notified in the MAC CE at the time of transmitting the MAC CE in the case of LEO. As such, the SIB, RRC signaling, and MAC CE may be used in combination. The value notified using the MAC CE may be a difference value from the value notified using the SIB or RRC signaling. In this case, the number of notification bits in the MAC CE can be reduced.

In the above-described embodiments, the MAC CE action start timing may be switched between terminals or operation scenarios, or the MAC CE action start timing to be used may be designated using the SIB. In addition, the MAC CE action timing may differ between a HARQ process in which HARQ-ACK feedback is enabled (HARQ-feedback enabled HARQ process) and a HARQ process in which the HARQ-ACK feedback is disabled (HARQ-feedback disabled HARQ process). For example, when the MAC CE is transmitted with the HARQ process in which the HARQ-ACK feedback is not performed, MAC CE application timing configuration method 3 or 4 (Embodiment 2) may be used to apply the MAC CE prior to the HARQ-ACK timing, and when the MAC CE is transmitted with the HARQ process in which the HARQ-ACK feedback is performed, the MAC CE may be applied after the HARQ-ACK feedback using MAC CE application timing configuration method 1 or 2 (Embodiment 1).

The HARQ-ACK may include an ACK, NACK, and DTX (non-transmission). When transmitting an ACK, the terminal applies the MAC CE at a predetermined timing. However, when transmitting a NACK for a PDSCH including the MAC CE or in the case of DTX, that is, when the PDSCH including the MAC CE cannot be decoded correctly or the assignment of PDSCH is not noticed (no PDCCH is received), the terminal does not apply the MAC CE. Also, when the base station receives the NACK or does not receive both of ACK and NACK, the MAC CE is not applied.

In the above-described embodiments, for example, the terminal applies the MAC CE three (or X) slots after the HARQ-ACK transmission timing with respect to the PDSCH in which the MAC CE is included. On the other hand, when the HARQ-feedback disabled HARQ process is used, no HARQ-ACK transmission is performed. In this case, the MAC CE may be applied at a timing 3 slots after a timing assumed as HARQ-ACK transmission (for example, hypothetical HARQ-ACK timing) which is actually not transmitted. Further, the transmission timing of HARQ-ACK is determined using the value of $K_1$ (offset value from the PDSCH slot) notified with the DCI at the time of PDSCH scheduling. Although no HARQ-ACK is actually transmitted, the hypothetical HARQ-ACK timing may be determined using the notified value of $K_1$. Also, when the HARQ feedback is disabled, the value of $K_1$ is not required basically. It is thus possible that the value of $K_1$ is not notified in the DCI, is used for another purpose, or is treated as a disabled field. In this case, the minimum value or the maximum value from among values configured as candidates for the $K_1$ value may be used. In addition, which value to use as the $K_1$ value when the HARQ-feedback is disabled may be configured, or a default value may be determined in the specifications. Thus, since the MAC CE action timing is uniquely specified, the recognition can be consistent between the base station and the terminal.

In the above embodiments, in the case where no downlink-uplink timing difference occurs, $K_{MAC\_ACTION}$ may be configured to zero and notified to the terminal. Additionally or alternatively, $K_{MAC\_ACTION}$ may be notified to the terminal only when the downlink-uplink timing difference occurs. In this case, when no downlink-uplink timing difference occurs, $K_{MAC\_ACTION}$ is not notified to the terminal. In addition, the terminal may be notified of timing offset information common to the cell or beam in order that the terminal performs a timing control (e.g., Timing Advance) such that no downlink-uplink timing difference occurs. $K_{MAC\_ACTION}$ may be notified when no timing offset common to the cell or beam is notified.

The expression "section" used in the above-described embodiments may be replaced with another expression such as "circuit (circuitry)," "device," "unit," or "module."

<5G NR System Architecture and Protocol Stack>

3GPP has been working at the next release for the 5th generation cellular technology, simply called 5G, including the development of a new radio access technology (NR) operating in frequencies ranging up to 100 GHz. The first version of the 5G standard was completed at the end of 2017, which allowed proceeding to 5G NR standard-compliant trials and commercial deployments of terminals (e.g., smartphones).

Figure 13:
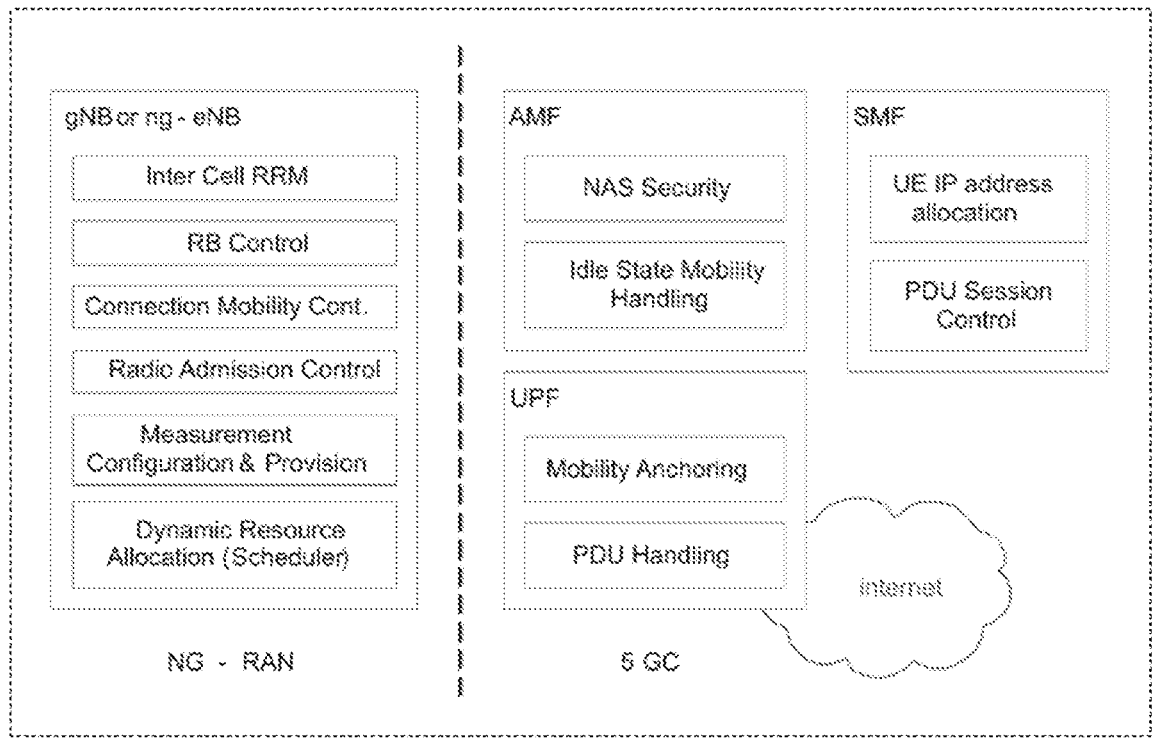
FIG. 13 schematically illustrates a functional split between NG-RAN and 5GC.

For example, the overall system architecture assumes an NG-RAN (Next Generation-Radio Access Network) that includes gNBs. The gNB provides the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 13 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC, and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1?10?5 within 1 ms). Finally, mMTC may preferably require high connection density (1,000,000 devices/km2 in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 KHz, 60 KHz . . . are being considered at the moment. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

<Functional Split between NG-RAN and 5GC in 5G NR>

FIG. 13 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;
IP header compression, encryption, and integrity protection of data;
Selection of an AMF during UE attachment in such a case when no routing to an AMF can be determined from the information provided by the UE;
Routing user plane data towards the UPF;
Routing control plane information towards the AMF;
Connection setup and release;
Scheduling and transmission of paging messages;
Scheduling and transmission of system broadcast information (originated from the AMF or an action management maintenance function (OAM: Operation, Admission, Maintenance));
Measurement and measurement reporting configuration for mobility and scheduling;
Transport level packet marking in the uplink;
Session management;
Support of network slicing;
QoS flow management and mapping to data radio bearers;
Support of UEs in the RRC_INACTIVE state;
Distribution function for NAS messages;
Radio access network sharing;
Dual connectivity; and
Tight interworking between NR and E-UTRA.

The Access and Mobility Management Function (AMF) hosts the following main functions:

Function of Non-Access Stratum (NAS) signaling termination;
NAS signaling security;
Access Stratum (AS) security control;
Inter-Core Network (CN) node signaling for mobility between 3GPP access networks;
Idle mode UE reachability (including control and execution of paging retransmission);
Registration area management;
Support of intra-system and inter-system mobility;

Access authentication;
Access authorization including check of roaming rights;
Mobility management control (subscription and policies);
Support of network slicing; and
Session Management Function (SMF) selection.

In addition, the User Plane Function (UPF) hosts the following main functions:
Anchor Point for intra-/inter-RAT mobility (when applicable);
External Protocol Data Unit (PDU) session point for interconnection to a data network;
Packet routing and forwarding;
Packet inspection and a user plane part of Policy rule enforcement;
Traffic usage reporting;
Uplink classifier to support routing traffic flows to a data network;
Branching point to support multi-homed PDU session;
QoS handling for user plane (e.g., packet filtering, gating, UL/DL rate enforcement);
Uplink traffic verification (SDF to QoS flow mapping); and
Function of downlink packet buffering and downlink data notification triggering.

Finally, the Session Management Function (SMF) hosts the following main functions:
Session management;
UE IP address allocation and management;
Selection and control of UPF;
Configuration function for traffic steering at the User Plane Function (UPF) to route traffic to a proper destination;
Control part of policy enforcement and QoS; and
Downlink data notification.

<RRC Connection Setup and Reconfiguration Procedure>

Figure 14:
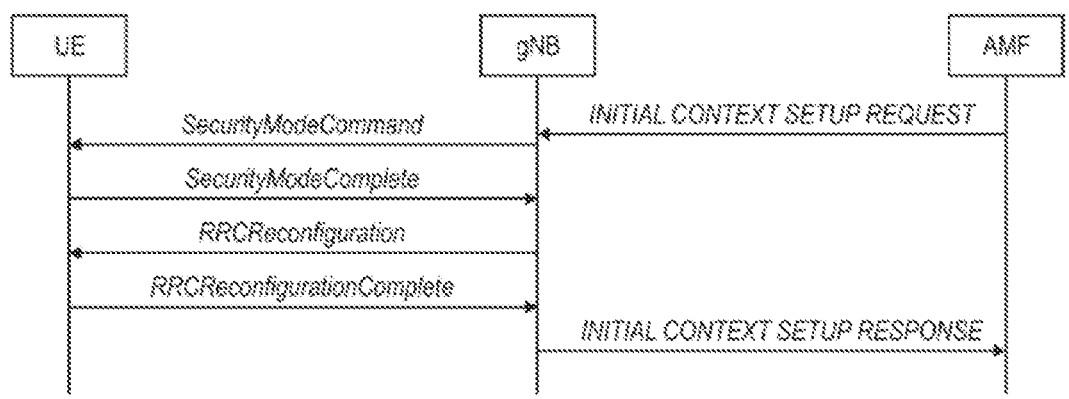
FIG. 14 is a sequence diagram of an RRC Connection Setup/Reconfiguration Procedure.

FIG. 14 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a Security ModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB informs the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which, in operation, transmits an initial context setup message to the gNodeB via the NG connection such that a signaling radio bearer between the gNodeB and a User Equipment (UE) is configured up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 15:
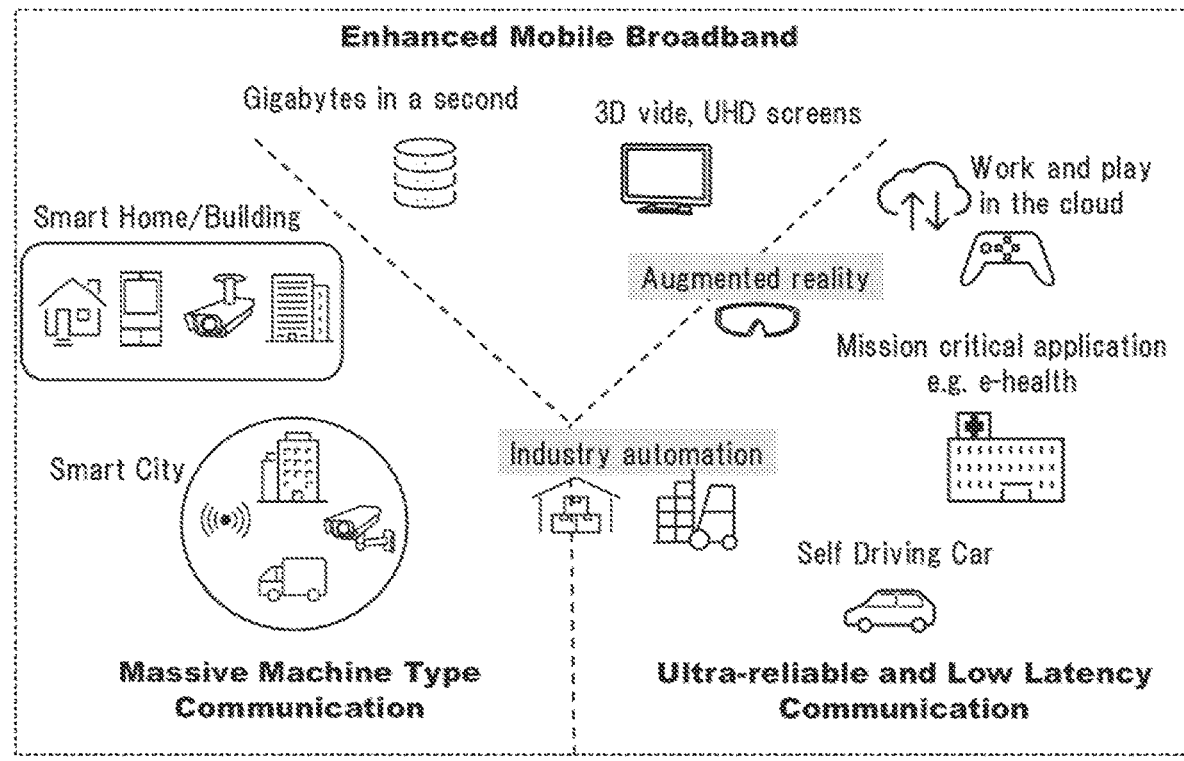
FIG. 15 schematically illustrates usage scenarios of enhanced Mobile BroadBand (eMBB), massive Machine Type Communications (mMTC), and Ultra Reliable and Low Latency Communications (URLLC)

FIG. 15 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 15 illustrates some examples of envisioned usage scenarios for IMT for 2020 and beyond (see e.g., ITU-R M.2083 FIG. 21).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been identified such as factory automation, transport industry and electrical power distribution. The tighter requirements are higher reliability (up to 10-6 level), higher availability, packet sizes of up to 256 bytes, time synchronization down to the order of a few us where the value can be one or a few μs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both Qos flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearer (DRB) together with the PDU Session. e.g., as illustrated above with reference to FIG. 14. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL Qos Flows with DRBs.

Figure 16:
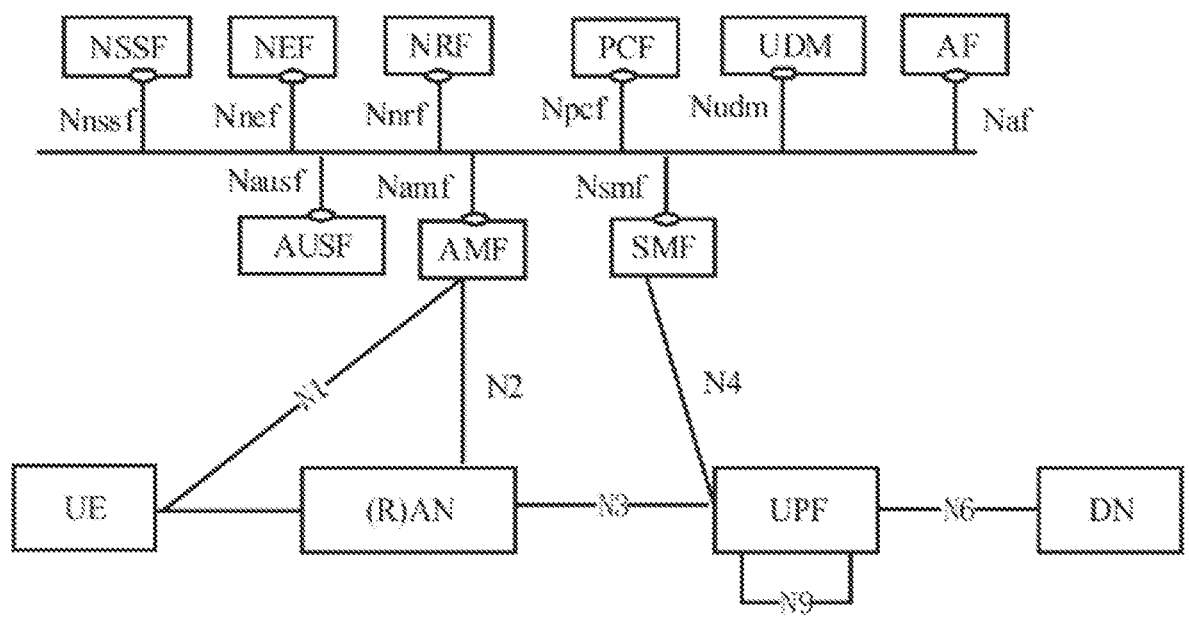
FIG. 16 is a block diagram illustrating an exemplary 5G system architecture for a non-roaming scenario.

FIG. 16 illustrates a 5G NR non-roaming reference architecture (see TS 23.501 v16.1.0, section 4.23). An Application Function (AF), e.g., an external application server hosting 5G services, exemplarily described in FIG. 15, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 16 illustrates further functional units of the 5G architecture, namely Network Slice Selection Function (NSSF), Network Repository Function (NRF), Unified Data Management (UDM), Authentication Server Function (AUSF), Access and Mobility Management Function (AMF). Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that includes: a transmitter, which, in operation, transmits a request containing a QoS requirement for at least one of URLLC, eMMB and mMTC services to at least one of functions (for example NEF, AMF, SMF, PCF, UPF, etc.) of the 5GC to establish a PDU session including a radio bearer between a gNodeB and a UE in accordance with the QOS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A reception apparatus according to one exemplary embodiment of the present disclosure includes: reception circuitry, which, in operation, receives a MAC Control Element (MAC CE) and an offset value; and control circuitry, which, in operation, configures, based on the offset value, a slot in which an action based on a control command of the MAC CE is started.

In one exemplary embodiment of the present disclosure, based on a slot in which the action in an uplink is started and the offset value, the control circuitry configures a slot in which the action in a downlink is started.

In one exemplary embodiment of the present disclosure, based on a transmission timing of response information in response to a Physical Downlink Shared Channel (PDSCH) including the MAC CE, the control circuitry configures the slot in which the action in the uplink is started.

In one exemplary embodiment of the present disclosure, based on a reception timing of a Physical Downlink Shared Channel (PDSCH) including the MAC CE and the offset value, the control circuitry configures a slot in which the action in a downlink is started.

In one exemplary embodiment of the present disclosure, based on a transmission timing of response information in response to a Physical Downlink Shared Channel (PDSCH) including the MAC CE, the control circuitry configures slots in which the action in an uplink and a downlink is started.

A transmission apparatus according to an embodiment of the present disclosure includes: control circuitry, which, in operation, configures, based on an offset value, a slot in which an action based on a control command of a MAC Control Element (MAC CE) is started; and transmission circuitry, which, in operation, transmits the offset value and the MAC CE.

A reception method according to one exemplary embodiment of the present disclosure includes steps performed by a reception apparatus of: receiving a MAC Control Element (MAC CE) and an offset value; and configuring, based on the offset value, a slot in which an action based on a control command of the MAC CE is started.

A transmission method according to one exemplary embodiment of the present disclosure includes steps performed by a transmission apparatus of: configuring, based on an offset value, a slot in which an action based on a control command of a MAC Control Element (MAC CE) is started; and transmitting the offset value and the MAC CE.

The present patent application claims the benefit of priority based on Japanese Patent Application No. 2020-022830 filed with the Japanese Patent Office on Feb. 13, 2020. The content of Japanese Patent Application No. 2020-022830 is incorporated herein by reference.

INDUSTRIAL APPLICABILITY

One aspect of the present disclosure is useful for radio communication systems.

REFERENCE SIGNS LIST

100 Terminal
101 HARQ-ACK generator
102, 206 Data generator
103 Data transmission processor
104, 208 Radio transmitter
105, 201 Antenna
106, 202 Radio receiver
107, 203 Data reception processor
108 Location information obtainer
109 Timing controller
110, 209 Controller
200 Base station
204 Timing control information generator
205 MAC CE controller
207 Data transmission processor

The invention claimed is:

1. A reception apparatus, comprising:
reception circuitry, which, in operation, receives a MAC Control Element (MAC CE) and an offset value; and
control circuitry, which, in operation, configures, based on the offset value, a timing of applying an action in an uplink based on a control command of the MAC CE,
wherein based on the timing of applying the action in the uplink and the offset value, the control circuitry configures a timing of applying the action in a downlink.

2. The reception apparatus according to claim 1, wherein based on a transmission timing of response information in response to a Physical Downlink Shared Channel (PDSCH) including the MAC CE, the control circuitry configures the timing of applying the action in the uplink.

3. The reception apparatus according to claim 1, wherein the offset value indicates a number of slots and is indicated by a higher layer signaling.

4. The reception apparatus according to claim 1, wherein the offset value is provided if a downlink timing is not aligned with an uplink timing at a gNB in a Non-Terrestrial Network (NTN).

5. A reception apparatus, comprising:
reception circuitry, which, in operation, receives a MAC Control Element (MAC CE) and an offset value; and
control circuitry, which, in operation, configures, based on the offset value, a timing of applying an action based on a control command of the MAC CE,
wherein based on a reception timing of a Physical Downlink Shared Channel (PDSCH) including the MAC CE and the offset value, the control circuitry configures a timing of applying the action in a downlink.

6. A reception apparatus, comprising:
reception circuitry, which, in operation, receives a MAC Control Element (MAC CE) and an offset value; and
control circuitry, which, in operation, configures, based on the offset value, a timing of applying an action based on a control command of the MAC CE,
wherein based on a transmission timing of response information in response to a Physical Downlink Shared Channel (PDSCH) including the MAC CE and the offset value, the control circuitry configures a timing of applying the action in a downlink.

7. The reception apparatus according to claim 6, wherein based on the transmission timing of the response information in response to the PDSCH including the MAC CE, the control circuitry configures a timing of applying the action in an uplink without using the offset value.

8. A reception method, comprising steps performed by a reception apparatus of:
receiving a MAC Control Element (MAC CE) and an offset value;
configuring, based on the offset value, a timing of applying an action based on a control command of the MAC CE; and
configuring, based on a timing of applying the action in an uplink and the offset value, a timing of the action in a downlink.

9. The reception method according to claim 8, comprising:
configuring, based on a transmission timing of response information in response to a Physical Downlink Shared Channel (PDSCH) including the MAC CE, the timing of applying the action in the uplink.

10. The reception method according to claim 8, wherein the offset value indicates a number of slots and is indicated by a higher layer signaling.

11. The reception method according to claim 8, wherein the offset value is provided if a downlink timing is not aligned with an uplink timing at a gNB in a Non-Terrestrial Network (NTN).

12. A reception method, comprising steps performed by a reception apparatus of:
receiving a MAC Control Element (MAC CE) and an offset value;
configuring, based on the offset value, a timing of applying an action based on a control command of the MAC CE; and
configuring, based on a reception timing of a Physical Downlink Shared Channel (PDSCH) including the MAC CE and the offset value, a timing of applying the action in a downlink.

13. A reception method, comprising steps performed by a reception apparatus of:
receiving a MAC Control Element (MAC CE) and an offset value;
configuring, based on the offset value, a timing of applying an action based on a control command of the MAC CE; and
configuring, based on a transmission timing of response information in response to a Physical Downlink Shared Channel (PDSCH) including the MAC CE and the offset value, a timing of applying the action in a downlink.

14. The reception method according to claim 13, comprising:
configuring, based on the transmission timing of the response information in response to the PDSCH including the MAC CE, a timing of applying the action in an uplink without using the offset value.

* * * * *